United States Patent
Li et al.

(10) Patent No.: US 10,762,721 B2
(45) Date of Patent: Sep. 1, 2020

(54) IMAGE SYNTHESIS METHOD, DEVICE AND MATCHING IMPLEMENTATION METHOD AND DEVICE

(71) Applicant: Tencent Technology (Shenzhen) Company Limited, Shenzhen (CN)

(72) Inventors: Bing Li, Shenzhen (CN); Jiang Pan, Shenzhen (CN); Yang Lan, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 16/298,884

(22) Filed: Mar. 11, 2019

(65) Prior Publication Data
US 2019/0206145 A1  Jul. 4, 2019

Related U.S. Application Data

(63) Continuation of application No. PCT/CN2017/111500, filed on Nov. 17, 2017.

(30) Foreign Application Priority Data

Nov. 24, 2016 (CN) ........................ 2016 1 1045200
Nov. 24, 2016 (CN) ........................ 2016 1 1051058

(51) Int. Cl.
*G06T 19/20* (2011.01)
*G06T 13/40* (2011.01)
(Continued)

(52) U.S. Cl.
CPC .............. *G06T 19/20* (2013.01); *G06T 13/40* (2013.01); *G06T 15/503* (2013.01); *G06T 15/80* (2013.01);
(Continued)

(58) Field of Classification Search
None
See application file for complete search history.

(56) References Cited

U.S. PATENT DOCUMENTS

| | | | |
|---|---|---|---|
| 2010/0182329 A1* | 7/2010 | Yamaguchi | G06T 13/40 345/474 |
| 2017/0032560 A1* | 2/2017 | Dionne | G06T 13/40 |
| 2017/0216718 A1* | 8/2017 | Polzin | G06K 9/00342 |

FOREIGN PATENT DOCUMENTS

| | | |
|---|---|---|
| CN | 101620741 A | 1/2010 |
| CN | 104008557 A | 8/2014 |

(Continued)

OTHER PUBLICATIONS

Tencent Technology, IPRP, PCT/CN2017/111500, dated May 28, 2019, 7 pgs.

(Continued)

*Primary Examiner* — YuJang Tswei
(74) *Attorney, Agent, or Firm* — Morgan, Lewis & Bockius LLP

(57) ABSTRACT

Embodiments of the present disclosure disclose an image compositing method and apparatus, used for harmoniously obtaining and displaying a simulation object composited with an accessory, so that a user has desirable experience and visual enjoyment. The apparatus obtains first data of a skeletal model of a simulation object and skeleton data of an accessory to be composited to the simulation object and determines, based on the first data and the skeleton data of the accessory, a target skeleton that is on the skeletal model and that corresponds to the accessory. The apparatus copies first target data of the target skeleton from the first data and adjusts the first target data of the target skeleton based on preconfigured offset data of the target skeleton to obtain first adjusted data. Finally the apparatus performs shading based (Continued)

on the first adjusted data and the first data to obtain the simulation object composited with the accessory.

15 Claims, 20 Drawing Sheets

(51) Int. Cl.
    *G06T 15/80*     (2011.01)
    *G06T 15/50*     (2011.01)
(52) U.S. Cl.
    CPC ............... *G06T 2219/2004* (2013.01); *G06T 2219/2016* (2013.01)

(56) References Cited

FOREIGN PATENT DOCUMENTS

| | | |
|---|---|---|
| CN | 104021584 A | 9/2014 |
| CN | 105654334 A | 6/2016 |
| CN | 106504309 A | 3/2017 |
| CN | 106780766 A | 5/2017 |

OTHER PUBLICATIONS

Tencent Technology, ISRWO, PCT/CN2017/111500, dated Feb. 28, 2018, 9pgs.

\* cited by examiner

IMAGE SYNTHESIS METHOD, DEVICE AND MATCHING IMPLEMENTATION METHOD AND DEVICE

CROSS-REFERENCE TO RELATED APPLICATIONS

This application is a continuation application of PCT/CN2017/111500, entitled "IMAGE SYNTHESIS METHOD AND DEVICE, AND MATCHING IMPLEMENTATION METHOD AND DEVICE" filed on Nov. 17, 2017, which claims priority to Chinese Patent Application No. 201611045200.4, entitled "IMAGE COMPOSITING METHOD AND IMAGE COMPOSITING APPARATUS" filed on Nov. 24, 2016 and Chinese Patent Application No. 201611051058.4, entitled "MATCHING IMPLEMENTATION METHOD AND RELATED APPARATUS" filed on Nov. 24, 2016, all of which are incorporated by reference in their entirety.

FIELD OF THE TECHNOLOGY

The present disclosure relates to the computer field, and in particular, to image compositing and matching implementation.

BACKGROUND OF THE DISCLOSURE

Generally, in large 3D interactive applications, different simulation objects are adapted by using a same accessory: an avatar resource. In the 3D interactive applications, generally, when simulation objects greatly differ from each other and an avatar is added to different simulation objects, a goof problem is caused. The avatar is bound to a fixed skeleton of a simulation object, and different simulation objects have different binding requirements on the avatar. Therefore, a problem such as offset of a displaying effect, goof, or angle incorrectness is caused. If an avatar is manufactured for each virtual object, the workload in arts is greatly increased, and a large hard disk capacity is occupied.

Therefore, in existing character manufacture, a simulation object usually includes a skeletal model and skin. If the simulation object further includes an avatar, to reduce the workload in arts and save a hard disk resource, skeleton offset data used for avatar displaying is usually first stored. When shading calculation is performed on the simulation object, the pre-stored skeleton offset data is referenced to adjust a skeleton in the simulation object, so that the accessory is harmoniously mounted to the simulation object.

However, in the foregoing manner, the skin is partially the same as the skeleton bound to the avatar. Therefore, the skin of the simulation object may change when the sizes of the skeletal model and the avatar are simultaneously changed. Therefore, in the current manner, when the avatar is adjusted, the skeletal model of the simulation object changes, and further, the skin of the simulation object changes, that is, displaying of the simulation object is deformed, causing a poor displaying effect.

SUMMARY

Embodiments of the present disclosure provide an image compositing method and apparatus and a matching implementation method and apparatus, to harmoniously display a simulation object (also referred to as a virtual object) composited with an accessory (also referred to as a virtual accessory), so that a user has desirable experience and visual enjoyment.

According to a first aspect of the present disclosure, an embodiment of the present disclosure provides an image compositing method performed at a computing device having one or more processors and memory storing programs to be executed by the one or more processors, the method comprising:

obtaining first data of a skeletal model of a simulation object and skeleton data of an accessory to be composited to the simulation object;

determining, based on the first data and the skeleton data of the accessory, a target skeleton that is on the skeletal model and that corresponds to the accessory;

obtaining, from the first data, first target data corresponding to the target skeleton;

adjusting, based on preconfigured offset data of the target skeleton, the first target data corresponding to the target skeleton to obtain first adjusted data; and performing shading based on the first adjusted data and the first data to obtain the simulation object composited with the accessory.

According to a second aspect of the present disclosure, an embodiment of the present disclosure further provides a computing device having one or more processors, memory and a plurality of programs that, when executed by the one or more processors, cause the computing device to perform the aforementioned image compositing method.

According to a third aspect of the present disclosure, an embodiment of the present disclosure further provides a non-transitory computer readable storage medium storing a plurality of instructions in connection with a computing device having one or more processors, wherein the plurality of instructions, when executed by the one or more processors, cause the computing device to perform the aforementioned image compositing method.

In the embodiments of the present disclosure, the virtual accessory and the virtual object are independent of each other and may be respectively designed and developed. A virtual part and the virtual object that are independent of each other may be adapted with each other by using the mounting correction information, so that a same accessory may be adapted with different virtual objects. Compared with a current implementation in which the virtual accessory and the virtual object are designed into integrity, the flexibility and the adaptability in the present disclosure are greatly improved.

BRIEF DESCRIPTION OF THE DRAWINGS

To describe the technical solutions in the embodiments of the present disclosure more clearly, the following briefly introduces the accompanying drawings required for describing the embodiments and the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The technical solutions in the present disclosure are mainly applied to an interactive application system. The interactive application system may include a plurality of simulation objects (which may also be referred to as a virtual object below). Different accessories, namely, avatars (which may also be referred to as virtual accessories below) may be configured for each simulation object. In a 3D model, different simulation objects are generally adapted by using a same avatar resource. It should be understood that the simulation object herein includes, but is not limited to a character simulation object, an animal simulation object, a machine simulation object, and a plant simulation object. A character simulation object is used as an example below for description. For example, different character simulation objects may be adapted by using a same helmet, or different character simulation objects are adapted by using a same cloak.

It should be noted that the interactive application system to which the technical solutions in the present disclosure are mainly applied is a game application scenario. The simulation object is a virtual role or the like of a player in the game scenario, and the accessory is a helmet, a ribbon, a cloak, a sword accessory, or the like.

Currently, a simulation object generally has a skeletal model and a skin. If the simulation object further has an avatar, to reduce the workload in arts and save a hard disk resource, offset data of a to-be-adjusted skeleton is generally first stored. The offset data of the to-be-adjusted skeleton is used for displaying of the avatar. Then, the skeleton of the simulation object is adjusted with reference to the pre-stored offset data during shading calculation. However, the foregoing processing manner causes a change of the simulation object when the sizes of the skeletal model and the avatar are simultaneously changed. Therefore, the skin of the simulation object and the skeleton bound to the avatar are partially the same. Therefore, the skin of the simulation object changes as the skeleton bound to the avatar changes, and consequently the simulation object also changes.

Figure 1:
FIG. 1 is a schematic diagram of inharmonious displaying after an avatar is added to a simulation object according to an embodiment of the present disclosure.
Figure 2:
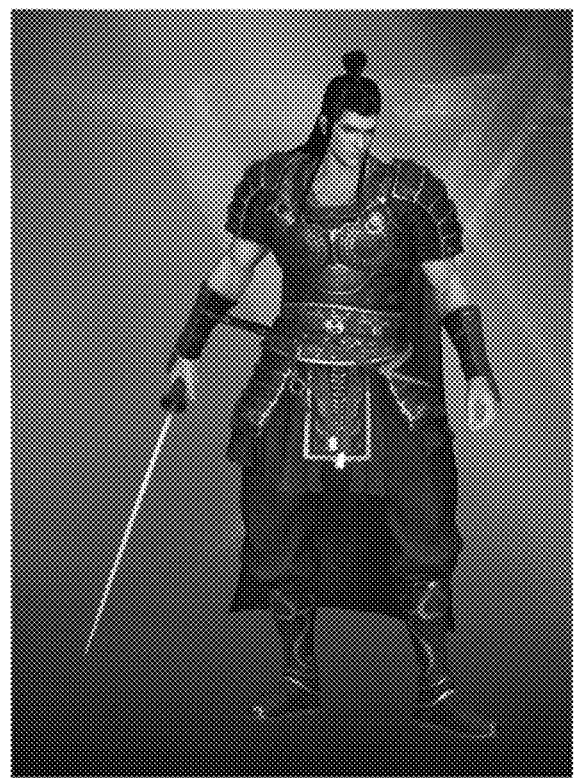
FIG. 2 is a schematic diagram of normal displaying after an avatar is added to a simulation object according to an embodiment of the present disclosure.
Figure 3:
FIG. 3 is another schematic diagram of inharmonious displaying after an avatar is added to a simulation object according to an embodiment of the present disclosure.
Figure 4:
FIG. 4 is another schematic diagram of normal displaying after an avatar is added to a simulation object according to an embodiment of the present disclosure.

For example, it is assumed that a cloak is added to a character simulation object. As shown in FIG. 1, FIG. 1 is a schematic diagram of an effect of adding a cloak to a character simulation object in a current manner. Shoulders of the character simulation object move upward after the cloak is added, and the displaying effect is inharmonious. Theoretically, relative to FIG. 1, a correct displaying effect after a cloak is added to a character simulation object is shown in FIG. 2. In addition, as shown in FIG. 3, FIG. 3 is a schematic diagram of another effect of adding a cloak to a character simulation object in a current manner. Obviously, the displaying effect is also inharmonious. Theoretically, relative to FIG. 3, correct displaying is shown in FIG. 4. It should be understood that FIG. 1 and FIG. 3 are merely two examples. Currently, there are various phenomena such as goof or offset of a displaying effect of a simulation object. During actual application, lots of cases in which a displaying effect of an accessory and a simulation object is inharmonious exist, and details are not described herein one by one.

Figure 5:
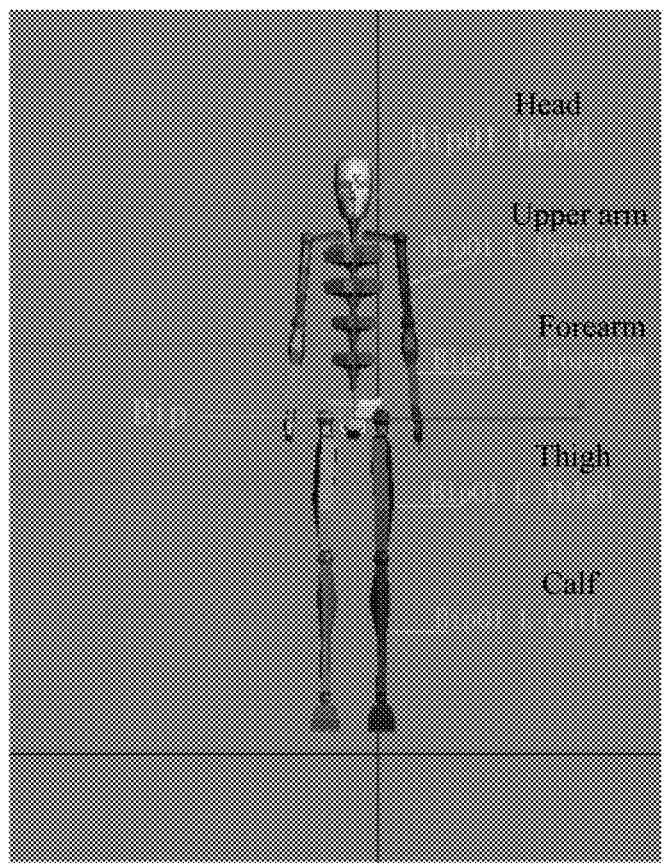
FIG. 5 is a schematic diagram of a skeletal model of a character simulation object according to an embodiment of the present disclosure.
Figure 6:
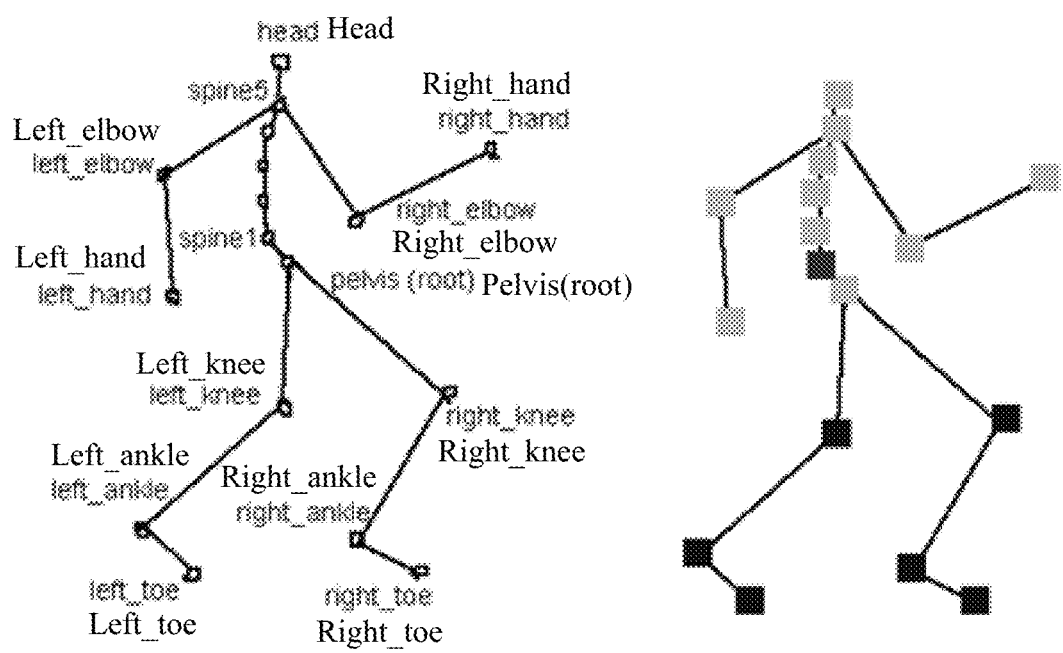
FIG. 6 is a schematic diagram of joint connection of a character simulation object according to an embodiment of the present disclosure.

In a skeleton animation, each character simulation object corresponds to a skeleton image. Specifically, as shown in FIG. 5, FIG. 5 is a schematic diagram of a skeleton model of a character simulation object. The skeleton animation principle used in the embodiments of the present disclosure is briefly described below. As the name implies, a skeleton animation is an animation driven by skeletons, and is a common animation manner in a modern mainstream 3D large interactive application. In the skeleton animation, a character has a skeleton, which may also be referred to as a skeleton model. The skeleton includes a group of bones. The bone is a joint between bones although named as bone. Actually, the skeleton is a coordinate system using a joint as an original point. In reality, there is a data structure of a joint instead of a bone. As shown in FIG. 6, FIG. 6 is a schematic diagram of joint connection of a character simulation object according to an embodiment of the present disclosure.

A simulation object in a skeleton animation may be divided into many parts (also referred to as meshes). These dispersive meshes are organized together by using a parent-child layer structure. A parent mesh drives motion of a child mesh belonging to the parent mesh. Coordinates of a vertex in each mesh are defined in a coordinate system of the mesh. In this way, each mesh moves as an integrity. Setting a location and an orientation of the simulation object is actually setting a location and an orientation of a root skeleton. A location and an orientation of each skeleton are calculated based on a transform relationship between a parent skeleton and a child skeleton in the skeleton layer structure, and then coordinates of the vertex in a world coordinate system are calculated based on binding between the skeleton and the vertex in the mesh, to shade the vertex.

The basic principle of the skeleton animation may be summarized as that under control of a skeleton, a vertex in a skin mesh is dynamically calculated through vertex blending. Motion of the skeleton is relative to a parent skeleton thereof and is driven by key frame data of the animation. A skeleton animation generally includes skeleton layer structure data, mesh data, mesh skin data (skin info), and animation (key frame) data of the skeleton. The skeleton layer structure data is mainly information about a parent-child relationship between joints. The mesh data and the mesh skin data (skin info) may be generally collectively referred to as skin data.

The mesh skin data determines how to bind a vertex to a skeleton. The mesh skin data of the vertex includes skeletons affecting the vertex and a weight when the skeletons affect the vertex. In addition, a bone offset matrix is required for each skeleton, and the bone offset matrix is used to transform the vertex from mesh space to a skeleton space. The skeleton controls motion of the skin, and motion of the skeleton is setting of animation data. Each key frame includes a time and skeleton animation information. In the skeleton animation information, new transform of the skeleton may be directly indicated by using a matrix, or rotation of the skeleton may be indicated by using a quaternion. Alternatively, data of skeleton motion may be customized. In addition to animation frame data that is edited and set, physical calculation may also be performed to perform real-time control on the skeleton. In the skeleton animation, the skeleton is the body of the model, and the mesh is merely similar to a skin and a garment.

The skeleton is coordinate space, and the skeleton layer is nested coordinate space. The joint only describes a location of the skeleton, that is, a location that is of an original point in coordinate space of the skeleton and that is in parent space of the skeleton. Rotation about the joint is rotation of the coordinate space (including all subspace) of the skeleton. A layer structure is formed, so that motion of a child skeleton can be controlled by using a parent skeleton. A slight move in one part may affect the situation as a whole. When a skeleton is changed, a location of a child skeleton does not need to be set and may be automatically obtained through calculation.

Terminologies in the skeleton animation are described below:

(1) Vertex Binding

A vertex on a kin is bound to one or more joints, and there is a weight for an effect of each joint on the vertex. Skinning means attaching (binding) a vertex in a mesh to a skeleton, and each vertex may be controlled by a plurality of skeletons. In this way, a vertex at the joint is pulled by a parent skeleton and a child skeleton and therefore a location is changed, resulting in crack elimination.

(2) A Process of Action of a Single Skeleton on a Vertex

A matrix of each bound joint is already known. A function transforms a vertex by using a skeleton, and the vertex is transformed from a mesh coordinate system to a world coordinate system, so that the vertex can be transformed from model space to corresponding joint space. A very important point is that regardless of how the joint is transformed, when the joint is transformed into the joint space, coordinates of the vertex do not change in a joint transform process. In this way, coordinates of the vertex in the joint space only need to be transformed from the joint space to the model space, to obtain transformed coordinates in the model space.

(3) A Process of Action of a Plurality of Skeletons on a Vertex

Calculation may be performed based on the following formula (1-1):

$$Mi = Mrp\text{-}s * Mb\text{-}rpi * Ms\text{-}bi \quad (1\text{-}1)$$

Transform to a root joint needs to be first calculated. After being transformed into the root joint, the vertex is then transformed into model space. i in the formula indicates the $i^{th}$ joint. In this way, a group of skin matrices Kj is generated. This array is referred to as a matrix palette. The meaning of the palette is selecting one matrix from the selected matrices for use. It should be understood that the skin matrix Kj herein is the same as Mi. In the formula 1-1, Ms-bi is a transform matrix from a skin coordinate system to a skeleton coordinate system during a pose binding. Mb-rpi is transformed coordinates from a coordinate system of a current joint to that of the root joint. Mrp-s is transformed coordinates from the coordinate system of the root joint to the skin coordinate system.

(4) Skinning of a Vertex to a Plurality of Joints (Skeletons)

$$V_M^C = \sum_{i=0}^{N-1} \omega_{ij} V_M^B K_{ji} \quad (1\text{-}2)$$

For a plurality of skeletons, the foregoing process is performed on each skeleton, and weight blending, in other words, vertex blending is performed on a result to obtain final world coordinates of the vertex. Brief summary: a transformed vertex of each joint is first multiplied by a weight and then accumulated. In the formula 1-2, $V_M^C$ indicates vertex binding in the model; $\omega_{ij}$ indicates the weight; $V_M^B$ indicates a vertex current in the model.

(5) Skeleton Skinning Algorithm $$V\text{final}=M\text{world}*Mw\text{-}s*Mb\text{-}w*Ms\text{-}b*V \quad (1\text{-}3)$$

$$V\text{final}=M\text{projection}*M\text{view}*M\text{world}*Mw\text{-}s*Mb\text{-}w*Ms\text{-}b*V \quad (1\text{-}4)$$

In the formulas, V indicates a coordinate value that is of a vertex in a mesh and that is in a coordinate system of a skin model. Ms-b means transforming coordinates of the vertex from the coordinate system of the skin model to a bind pose coordinate system of a bone. The matrix is exported along with a resource and exists in a Ni skinning mesh modifier.

Mprojection is a projection matrix. Mview is a view matrix. Mworld is a transform matrix from a model to a world. Mw-s is a transform matrix from the world to a skin. Mb-w is a transform matrix from a skeleton to the world. Ms-b is a transform matrix from the skin to the skeleton.

Mb-w is a difference from a common skeleton animation and transform to a root bone parent is cancelled. Transform (changed data) of the skin model still needs to be calculated subsequently through transform to the world coordinate system. Therefore, the world coordinate system is directly transformed into, thereby reducing the quantity of times of matrix calculation. It should be noted that the formula 1-4 indicates transformed screen coordinates.

A calculation procedure is also described in the calculation formula. In the procedure, calculation of Mb-w is what needing to be changed in the technical solutions in the present disclosure. Further, the effect of the bone to the skin is calculated. In this case, local transform (local changed data) may be provided for the root bone, to change the skin bound to the skeleton. However, to change data only affecting the avatar, special processing, that is, implementation in the technical solutions in the present disclosure, needs to be performed.

The execution body in the embodiments of the present disclosure is a terminal. The terminal may include any terminal device such as a computer, a server, a mobile phone, a tablet computer, a personal digital assistant (PDA), a point of sales (POS), or an in-vehicle computer.

Figure 7:
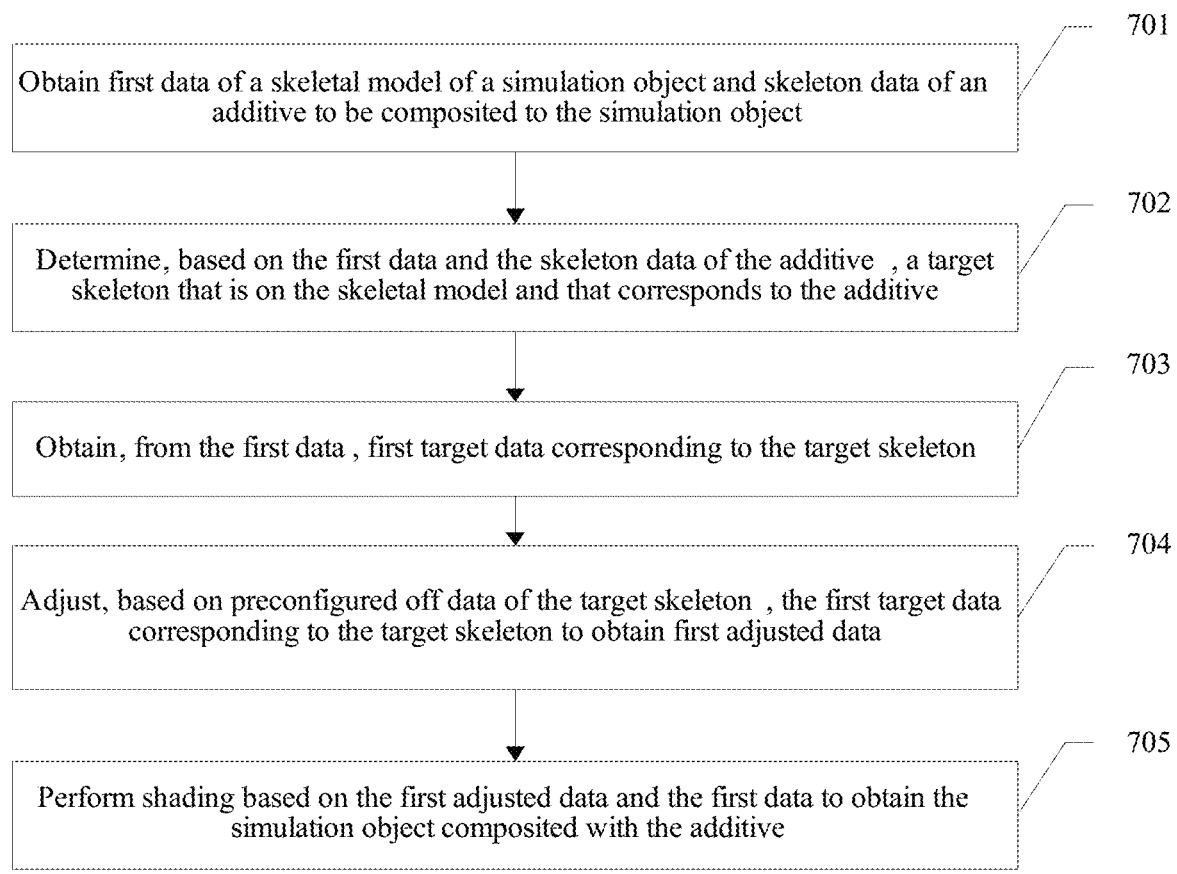
FIG. 7 is a schematic diagram of an embodiment of an image compositing method according to the embodiments of the present disclosure.

The technical solutions in the present disclosure are specifically described below by using embodiments. As shown in FIG. 7, FIG. 7 is a schematic diagram of an embodiment of an image compositing method according to the embodiments of the present disclosure. The method includes the following steps:

701: Obtain first data of a skeletal model of a simulation object and skeleton data of an accessory to be composited to the simulation object.

In this embodiment of the present disclosure, before image compositing is performed, the first data of the skeletal model of the simulation object, skin data of the simulation object, the skeleton data of the accessory to be composited to the simulation object, skin data of the accessory, and the like are pre-generated. An engine may invoke the foregoing pres-generated data, that is, the engine may obtain, from the pre-generated data, the first data of the skeletal model of the simulation object and the skeleton data of the accessory to be composited to the simulation object.

In addition, during actual application, the engine may further obtain the skin data of the simulation object, the skin data of the accessory, and the like. Specifically, detail information obtained by the engine includes, but is not limited to, the foregoing summary, and details are not described herein.

A diagram of the skeletal model of the simulation object may be shown in FIG. 5. It should be understood that the accessory in this embodiment of the present disclosure may be an external accessory such as a sword, a cloak, a helmet, an armor, and a glove.

702: Determine, based on the first data and the skeleton data of the accessory, a target skeleton that is on the skeletal model and that corresponds to the accessory.

In this embodiment of the present disclosure, after obtaining the first data and the skeleton data of the accessory, the engine may determine, based on the first data and the skeleton data of the accessory, the target skeleton that is on the skeletal model and that corresponds to the accessory. Specifically, the method may include: establishing a correspondence between the skeleton data of the accessory and the first data, so that the accessory is bound to the skeletal model, and determining the target skeleton.

Figure 8:
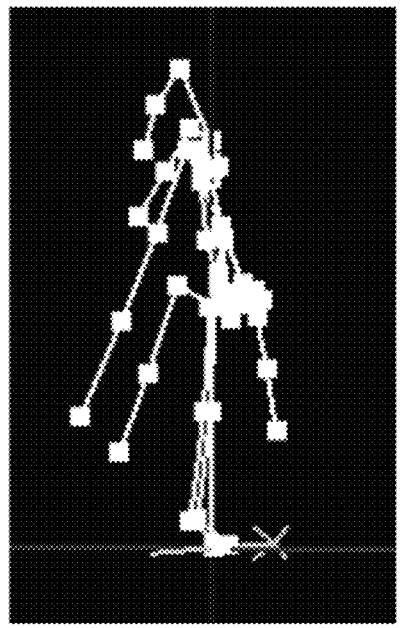
FIG. 8 is a schematic diagram of a skeletal model of a character simulation object according to an embodiment of the present disclosure.
Figure 9:
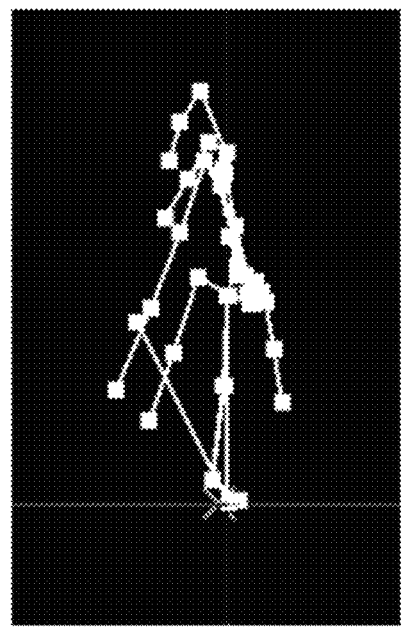
FIG. 9 is a schematic diagram of a cloak skeletal model of a character simulation object according to an embodiment of the present disclosure.
Figure 10:
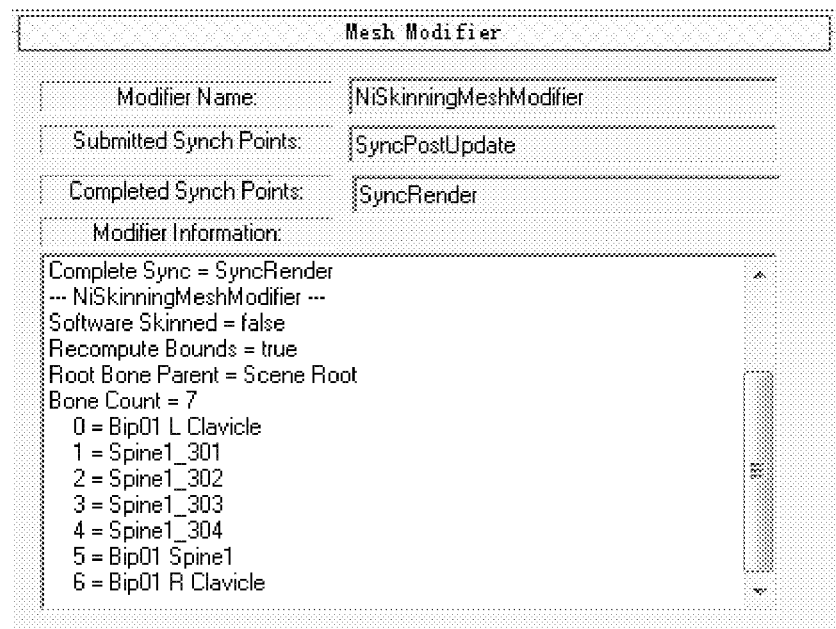
FIG. 10 is a schematic diagram of binding an accessory to a skeleton according to an embodiment of the present disclosure.

For example, binding of an avatar in a skeleton animation is shown in FIG. 8 and FIG. 9. FIG. 8 is a schematic diagram of a skeletal model of a simulation object, and FIG. 9 is a schematic diagram of a cloak skeleton. When a form of the accessory does not need to be adjusted, that is, offset data is not obtained, in this embodiment of the present disclosure, a piece of skeleton data may be copied from an avatar resource and a corresponding skeleton is bound in the resource. When the accessory is worn on a virtual character, the accessory may be re-bound to the skeleton of the simulation object based on a corresponding skeleton name, that is, skeleton binding of the avatar may be controlled in a resource manufacture process. In addition, there is no need to run two pieces of skeleton data in a program. Therefore, the skeleton in the avatar resource is mainly used for indexing, and a skin of the avatar is bound during running. In this case, an animation of the avatar is totally consistent with that of the simulation object. A bound skeleton in the avatar is shown in FIG. 10. These skeletons have same names as those of skeletons in the simulation object. It should be understood that after the skeleton data of the accessory and the skeletal model of the simulation object are bound together, the target skeleton related to the accessory can be determined.

703: Obtain, from the first data, first target data corresponding to the target skeleton.

In this embodiment of the present disclosure, after determining the target skeleton corresponding to the accessory, the engine may obtain, from the obtained first data of the skeletal model of the simulation object, the first target data corresponding to the target skeleton. In an implementation, the engine may copy, from the obtained first data of the skeletal model of the simulation object, the first target data corresponding to the target skeleton.

During actual application, both the obtained first data of the skeletal model of the simulation object and the first target data of the target skeleton corresponding to the accessory may be added to a corresponding nif file. The first target data of the target skeleton may also be referred to as data of an offset skeleton.

In addition, during actual application, the engine may further bind the skin data of the simulation object to the first data, to form skin binding data of the simulation object.

704: Adjust, based on preconfigured offset data of the target skeleton, the first target data corresponding to the target skeleton to obtain first adjusted data.

Currently, there is no solution of copying, from the first data of the skeletal model of the simulation object, the first target data corresponding to the target skeleton, and the offset data directly acts on the first data of the skeletal model. Therefore, after the engine performs adjustment, the skeletal model of the simulation object also changes. However, in the present disclosure, the first data of the skeletal model of the simulation object does not change. The offset data of the target skeleton corresponding to the accessory is preconfigured. The first target data of the target skeleton is adjusted based on the offset data to obtain the first adjusted data. The first adjusted data acts on displaying of the avatar.

In this embodiment of the present disclosure, the offset data of the target skeleton corresponding to the accessory is preconfigured. Specifically, the data may be obtained in an animation manufacture process. That is, in the animation manufacture process, the accessory is pre-added to the simulation object. The simulation object has the skeletal model and the skin. Next, whether a compositing displaying effect of the simulation object added with the accessory meets an expectation is determined. If the compositing displaying effect does not meet the expectation, the offset data of the target skeleton corresponding to the accessory may be further calculated based on a corresponding preset algorithm. It may further be vividly understood that in consideration of limited resources or the like in the skeleton animation, a corresponding avatar is usually not independently configured for each simulation object. Generally, different simulation objects are adapted by using a same avatar. However, simulation objects have different skeleton sizes (being high or short) and different skins (being fat or thin, a garment, and the like). Therefore, when a same avatar is added to different simulation objects, inconsistency may be caused, and adjustment needs to be performed based on an actual case of the simulation object. In this case, a piece of offset data, that is, the offset data of the target skeleton corresponding to the accessory, may be calculated.

The target skeleton may be understood as one or more skeletons in the skeletal model of the simulation object that the accessory needs to be bound to. During actual application, each accessory needs to be bound to a fixed skeleton in the skeletal model of the simulation object based on a corresponding design. For example, a cloak may be bound to one or more skeletons on shoulders of the simulation object, and a sword is bound to a skeleton on a hand part of the simulation object. Therefore, the one or more skeletons on the shoulders and the skeleton on the hand part are the target skeleton in this embodiment of the present disclosure.

It should be noted that once the first adjusted data obtained after the first target data is adjusted based on the preconfigured offset data of the target skeleton is used for image compositing, an effect such as moving a location of the avatar, rotating the avatar, or changing a size of the avatar may be achieved.

705: Perform shading based on the first adjusted data and the first data to obtain the simulation object composited with the accessory.

In this embodiment of the present disclosure, after the first target data of the target skeleton is adjusted based on the preconfigured offset data of the target skeleton to obtain the first adjusted data, shading is performed based on the first adjusted data and the first data to obtain the simulation object composited with the accessory.

In an implementation, the skin data of the simulation object and the skin data of the accessory are obtained; the skin data and the simulation object is bound to the first data to obtain the skin binding data of the simulation object, and the skin binding data is shaded to obtain the simulation object; the first adjusted data and the skin data of the accessory are shaded to obtain the accessory; at last, the obtained simulation object is composited with the accessory to obtain the simulation object composited with the accessory. It should be noted that the skin of the avatar may be bound in an animation operation process. A specific binding object is the first adjusted data.

In another implementation, the skin of the simulation object includes a plurality of vertexes, and the skin of the accessory also includes a plurality of vertexes. During actual application, first world coordinates of each vertex may be calculated based on the first adjusted data and the first data, and shading is performed based on the first world coordinates of each vertex, to obtain the simulation object composited with the accessory. Specifically, space transform (weight blending calculation, where the foregoing formulas 1-2 and 1-3 may be used) may be performed based on the first adjusted data and the first data, to obtain the first world coordinates of each vertex. Vertex blending calculation further needs to be performed on the first world coordinates of each vertex, and finally, shading is performed to obtain the simulation object composited with the accessory.

The solution provided in this embodiment of the present disclosure is performing avatar adjustment on a simulation object initially including an accessory. Specifically, an object adjusted based on the preconfigured offset data of the target skeleton is the first target data of the target skeleton. Therefore, the first data of the skeletal model of the simulation object does not change. At last, shading is performed based on the first adjusted data and the first data to obtain and display the simulation object composited with the accessory. The displayed simulation object having the accessory is harmonious, so that a user has desirable visual enjoyment and experience.

It should be understood that this embodiment of the present disclosure is described by using an example in which only one simulation object is adjusted. Correspondingly, the technical solution may be applied to another simulation object. For different simulation objects, the obtained offset data of the target skeleton corresponding to the accessory may be different because the simulation objects are generally different. In this embodiment of the present disclosure, corresponding adjustment may be performed based on offset data of different target skeletons, so that a same avatar may be harmoniously applied to different simulation objects.

Figure 11:
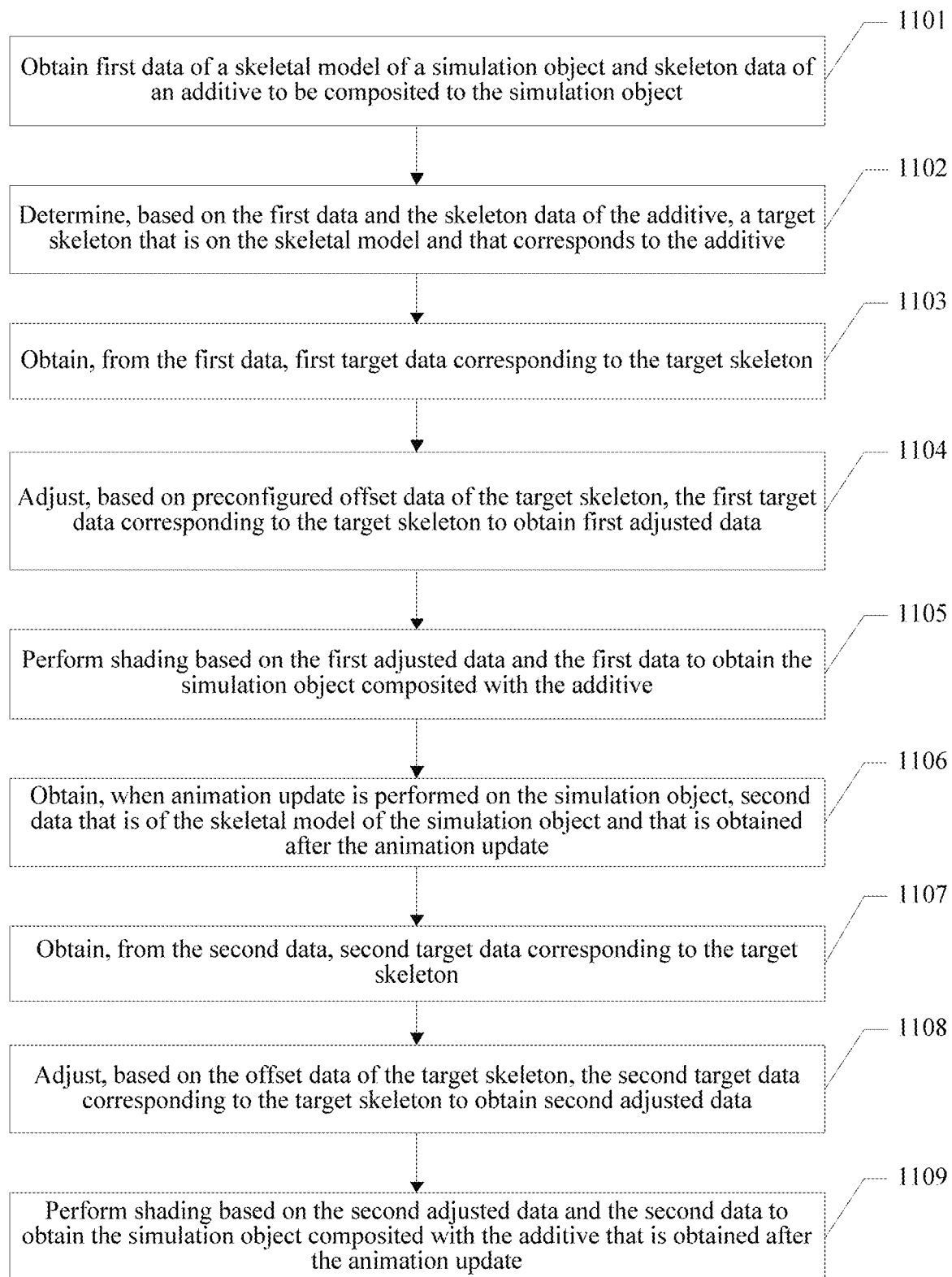
FIG. 11 is a schematic diagram of another embodiment of an image compositing method according to the embodiments of the present disclosure.

As shown in FIG. 11, FIG. 11 is a schematic diagram of another embodiment of an image compositing method according to the embodiments of the present disclosure. The method includes the following steps:

1101: Obtain first data of a skeletal model of a simulation object and skeleton data of an accessory to be composited to the simulation object.

1102: Determine, based on the first data and the skeleton data of the accessory, a target skeleton that is on the skeletal model and that corresponds to the accessory.

1103: Obtain, from the first data, first target data corresponding to the target skeleton.

1104: Adjust, based on preconfigured offset data of the target skeleton, the first target data corresponding to the target skeleton to obtain first adjusted data.

1105: Perform shading based on the first adjusted data and the first data to obtain the simulation object composited with the accessory.

In this embodiment of the present disclosure, steps 1101 to 1105 are the same as steps 701 to 705 in the embodiment shown in FIG. 7, and details are not described herein again.

1106: Obtain, when animation update is performed on the simulation object, second data that is of the skeletal model of the simulation object and that is obtained after the animation update.

In this embodiment of the present disclosure, when animation update is performed on the simulation object, the second data of the skeletal model of the simulation object after the animation update is obtained. Essentially, a displayed effect through animation update on the skeletal model is that the simulation object corresponding to the skeletal model changes, for example, that a character simulation object takes a step, reaches out an arm, rises a sword, runs, and squats. The second data obtained by an animation system based on the animation update of the skeletal model may correspondingly change data of a skin when animation display is performed on the simulation object.

1107: Obtain, from the second data, second target data corresponding to the target skeleton.

In this embodiment of the present disclosure, after the second data is obtained, the second target data of the target skeleton is obtained from the second data. Specifically, the second target data of the target skeleton may be copied from the second data. After animation update is performed on the skeletal model of the simulation object, data of the skeletal model also changes. Specifically, the second data may indicate a change of the data of the skeletal model. Correspondingly, data of the target skeleton corresponding to the accessory also changes. Therefore, in this embodiment of the present disclosure, the second target data of the target skeleton corresponding to the accessory is obtained from the second data to indicate a change of the data of the target skeleton corresponding to the accessory. During actual application, both the second data of the skeletal model of the simulation object and the second target data of the target skeleton may be added to a corresponding nif file. The second target data of the target skeleton may also be referred to as data of an offset skeleton.

1108: Adjust, based on the offset data of the target skeleton, the second target data corresponding to the target skeleton to obtain second adjusted data.

Currently, there is no solution of obtaining the second target data of the target skeleton from the second data, and the offset data directly acts on the second data of the skeletal model. Therefore, after an engine performs adjustment, the skeletal model of the simulation object also changes. However, in the present disclosure, the offset data of the target skeleton corresponding to the accessory is preconfigured. The second target data of the target skeleton is adjusted based on the offset data to obtain the second adjusted data. The second data of the skeletal model of the simulation object does not change. The second adjusted data acts on displaying of the avatar.

During actual application, the data (for example, the first target data and the second target data) of the offset skeleton may be modified based on the offset data of the target skeleton. The offset skeleton is not bound to a corresponding mesh. Therefore, the animation system does not update the offset skeleton, and a program needs to manually copy and modify corresponding transform data, and then sends the corresponding transform data to a shader. Then, the shader shades an avatar model (the accessory) based on the data.

It should be noted that once the second adjusted data obtained after the second target data is adjusted based on the preconfigured offset data of the target skeleton is used for image compositing, an effect such as changing a location of the avatar, rotating the avatar, or changing a size of the avatar may be achieved.

1109: Perform shading based on the second adjusted data and the second data to obtain the simulation object composited with the accessory that is obtained after the animation update.

In this embodiment of the present disclosure, after the second target data of the target skeleton is adjusted based on the preconfigured offset data of the target skeleton to obtain the second adjusted data, shading is performed based on the second adjusted data and the second data to obtain the simulation object composited with the accessory that is obtained after the animation update.

In an implementation, the skin of the simulation object includes a plurality of vertexes, and the skin of the accessory also includes a plurality of vertexes. Second world coordinates of each vertex are calculated based on the second adjusted data and the second data, and shading is performed based on the second world coordinates of each vertex, to obtain the simulation object composited with the accessory that is obtained after the animation update.

The solution provided in this embodiment of the present disclosure is avatar adjustment when animation update is performed on the simulation object including the accessory. Specifically, an object adjusted based on the offset data of the target skeleton is the second target data of the target skeleton. Because when the animation update is performed once, the data of the skeletal model of the simulation object changes, that is, the second data is generated, to obtain the second target data corresponding to the target skeleton. In an adjustment process, the second data of the skeletal model of the simulation object does not change. At least, shading is performed based on the second adjusted data and the second data, to obtain the simulation object composited with the accessory. The displayed simulation object having the accessory is harmonious, so that a user has desirable visual enjoyment and experience.

It should be understood that this embodiment is described by using an example in which only one simulation object is adjusted. Correspondingly, the technical solution may be applied to another simulation object. For different simulation objects, the obtained offset data of the target skeleton corresponding to the accessory may be different because the simulation objects are generally different. In this embodiment of the present disclosure, corresponding adjustment may be performed based on offset data of different target skeletons, so that a same avatar may be harmoniously applied to different simulation objects.

In this embodiment of the present disclosure, the skeleton data copied from the first data and the second data may be stored in a nif resource file of arts, or may be stored in a configuration file of another type. Transform and modification of the avatar may also be applied to a weapon on which skin animation is performed or each part of a character. For example, during attack, a hand part or another part may be enlarged.

For ease of understanding, the image compositing method in the present disclosure is described in detail below by using a specific application scenario. Specifically:

It is assumed that at present, there are three simulation objects which may be referred to as three military officers of different forms in short and an avatar which is a cloak. A first military officer A sits on horseback, a second military officer B is in a standing pose, and a third military officer C is in a pose of holding a hammer. An expected result is that a same cloak is hung on the three military officers of different forms and is in a harmonious state with the military officers of different forms. It is simply understood that the cloak is hung on different military officers and the cloak is made better attached to the poses of the military officers.

First, an application program for implementation of skeleton-skinning animation is installed. Generally, each simulation object in an interactive application (for example a network game) is first designed in arts, and then simulation objects needing a same avatar are determined. Different military officers and a same cloak are used herein as an example for description.

Skeleton data of the foregoing three military officers are preset, and skin data of the military officers is different and is correspondingly skin data A, skin data B, and skin data C. Cloak data is preset. The cloak data is hung on the foregoing three military officers based on design, to determine whether problems such as goof, location offset, or military officer inconsistency (cases such as that the military officer is excessively tall and the cloak is excessively small; the military officer is excessively short and the cloak is excessively large; the military officer is excessively fat and the cloak is excessively small; or the military officer is excessively thin and the cloak is excessively large) occur after the cloak is hung on the foregoing three military officers. If the problems occur, corresponding offset data is calculated. Certainly, hanging the cloak on the military officer means hanging the cloak on a target skeleton that corresponds to the military officer and that is on a skeletal model, that is, it is assumed that the target skeleton is two skeletons on two shoulders of the military officer.

The military officer A sits on horseback. If being hung on the military officer A, the cloak covers the armor on the shoulders of the military officer A from the back view, and a user feels that the military officer A is relatively obese and a displaying effect is poor. The military officer B is in a standing pose. If the cloak is hung on the military officer B, the military officer B is relatively short from the back view, and a displaying effect is also poor. The military officer C is in a pose of holding a hammer. The head of the military officer C is covered by the cloak from the back view, and a displaying effect is also poor. Therefore, offset data A of the military officer A relative to the cloak, offset data B of the military officer B relative to the cloak, and offset data C of the military officer C relative to the cloak may be calculated.

Figure 12:
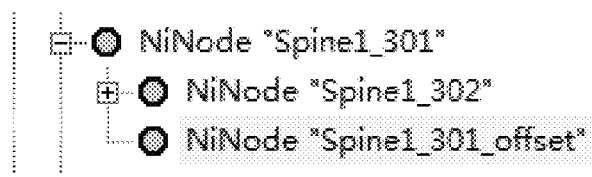
FIG. 12 is a schematic diagram of copying first target data of a target skeleton according to an embodiment of the present disclosure.

An engine invokes pre-obtained data, that is, the skeleton data A, the skin data A, the cloak data, and the offset data A of the military officer A; the skeleton data B, the skin data B, the cloak data, and the offset data B of the military officer B; and the skeleton data C, the skin data C, the cloak data, and the offset data C of the military officer C. During actual application, processing on a skeletal model whose avatar needs to be particularly adjusted is very simple, that is, adding several offset skeletons used for adjusting the corresponding avatar to a corresponding nif file. As shown in FIG. 12, FIG. 12 is a schematic diagram of obtaining first target data of a target skeleton. In FIG. 12, "Spine1_301_offset" that ends with offset is the skeleton added for adjusting the avatar, that is, the target skeleton.

Figure 13:
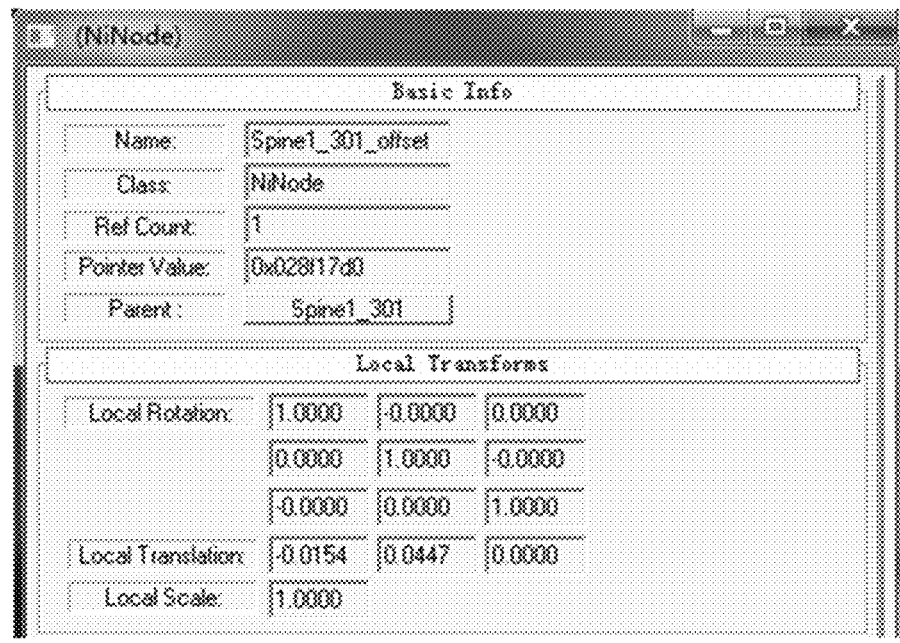
FIG. 13 is a schematic diagram of adjusting first target data of a target skeleton according to an embodiment of the present disclosure.

During actual application, the corresponding avatar is adjusted based on the offset skeleton in the nif resource file. In addition, local transform data of the target skeleton may be adjusted in arts based on a specific case, and the transform data only acts on the avatar on the character. As shown in FIG. 13, FIG. 13 is a schematic diagram of adjusting first target data of a target skeleton. Specific descriptions are provided below.

Figure 14:
FIG. 14 is a schematic diagram of harmony after a cloak of a military officer A is adjusted according to an embodiment of the present disclosure.

For the military officer A, after obtaining the skeleton data A, the engine further copies, from the skeleton data A, the first target data corresponding to the target skeleton, performs skin binding on the skeleton data A and the skin data A, and adjusts the first target data corresponding to the target skeleton based on the offset data A. The first adjusted data of the target skeleton is obtained after adjustment, and the first adjusted data acts on the cloak. At last, shading is performed by using the first adjusted data and data on which skin binding is performed. The cloak in an obtained composited image can be better adhered to the military officer A. From the back view, the cloak is hung on the shoulders but the armor is not covered, and it seems that the military officer A is relatively martial and domineering. As shown in FIG. 14, FIG. 14 is a schematic diagram of composition of the military officer A after the cloak is adjusted.

Figure 15:
FIG. 15 is a schematic diagram of harmony after a cloak of a military officer B is adjusted according to an embodiment of the present disclosure.

For the military officer B, after obtaining the skeleton data B, the engine further copies, from the skeleton data B, the first target data corresponding to the target skeleton, performs skin binding on the skeleton data B and the skin data B, and adjusts the first target data corresponding to the target skeleton based on the offset data B. The first adjusted data of the target skeleton is obtained through adjustment, and the first adjusted data acts on the cloak. At last, shading is performed by using the first adjusted data and data on which skin binding is performed. The cloak in an obtained composited image can be better adhered to the military officer B. From the back view, the cloak is hung on the shoulders. However, the size of the cloak is adjusted based on the height of the military officer B, and the military officer B hanging the cloak looks more harmonious. As shown in FIG. 15, FIG. 15 is a schematic diagram of composition of the military officer B after the cloak is adjusted.

Figure 16:
FIG. 16 is a schematic diagram of harmony after a cloak of a military officer C is adjusted according to an embodiment of the present disclosure.

For the military officer C, after obtaining the skeleton data C, the engine further copies, from the skeleton data C, the first target data corresponding to the target skeleton, performs skin binding on the skeleton data C and the skin data C, and adjusts the first target data corresponding to the target skeleton based on the offset data C. The first adjusted data of the target skeleton is obtained after adjustment, and the first adjusted data acts on the cloak. At last, shading is performed by using the first adjusted data and data on which skin binding is performed. The cloak in an obtained composited image can be better adhered to the military officer C. From the back view, the cloak is hung on the shoulders but the head of the military officer is not covered, and it seems that the military officer C holding the hammer is more martial and domineering. As shown in FIG. 16, FIG. 16 is a schematic diagram of composition of the military officer C after the cloak is adjusted.

It should be further noted that after the military officer A, the military officer B, and the military officer C are adjusted, during each animation update process, the corresponding cloak still needs to be adjusted based on an updated animation. The principle is similar to that described above. The offset data is initially obtained and remains unchanged, but after each animation, the skeleton data corresponding to different military officers changes, and the data of the target skeleton also changes and is denoted as the second target data. Then, a subsequent operation such as adjustment is performed on the second target skeleton data based on the offset data.

It should be understood that in the process of implementing the skeleton-skinning animation, there are lots of details, and the descriptions herein are merely provided for some cases in the present disclosure and are not a very complete process of implementing the skeleton-skinning animation. Therefore, during actual application, implementation of the skeleton-skinning animation includes, but is not limited to, the descriptions provided in the present disclosure.

After the technical solution in the present disclosure is used, a same avatar can be worn on different military officers, there is no location offset, and the avatar can be well adhered to the military officer. In addition, a player feels very cool after the avatar is worn and feels martial, domineering, and invincible on the battle field.

Figure 17:
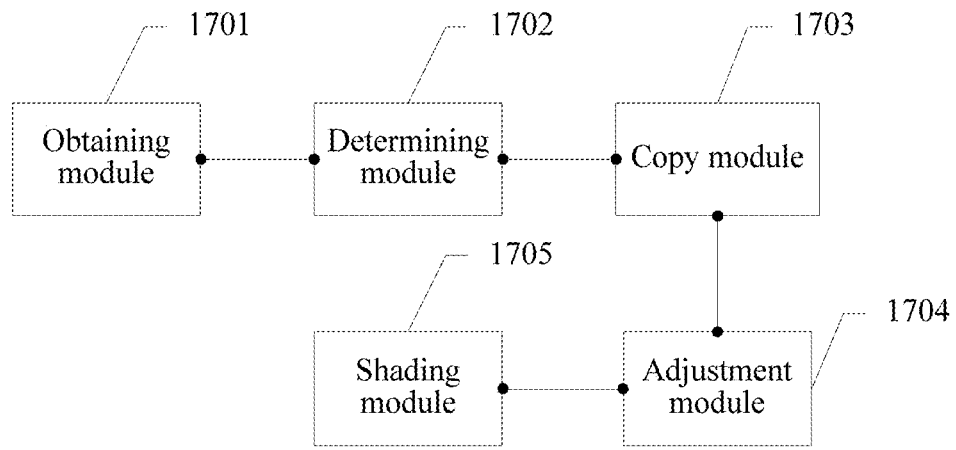
FIG. 17 is a schematic diagram of an embodiment of an image compositing apparatus according to the embodiments of the present disclosure.

The image compositing method in this embodiment of the present disclosure is described above, and an image compositing apparatus provided in the embodiments of the present disclosure is specifically described below. As shown in FIG. 17, FIG. 17 is a schematic diagram of an embodiment of an image compositing apparatus according to the embodiments of the present disclosure. The apparatus includes:

an obtaining module 1701, configured to obtain first data of a skeletal model of a simulation object and skeleton data of an accessory to be composited to the simulation object;

a determining module 1702, configured to determine, based on the first data and the skeleton data of the accessory, a target skeleton that is on the skeletal model and that corresponds to the accessory;

a copy module 1703, configured to obtain, from the first data, first target data corresponding to the target skeleton;

an adjustment module 1704, configured to adjust, based on preconfigured offset data of the target skeleton, the first target data corresponding to the target skeleton to obtain first adjusted data; and a shading module 1705, configured to perform shading based on the first adjusted data and the first data to obtain the simulation object composited with the accessory.

Figure 18:
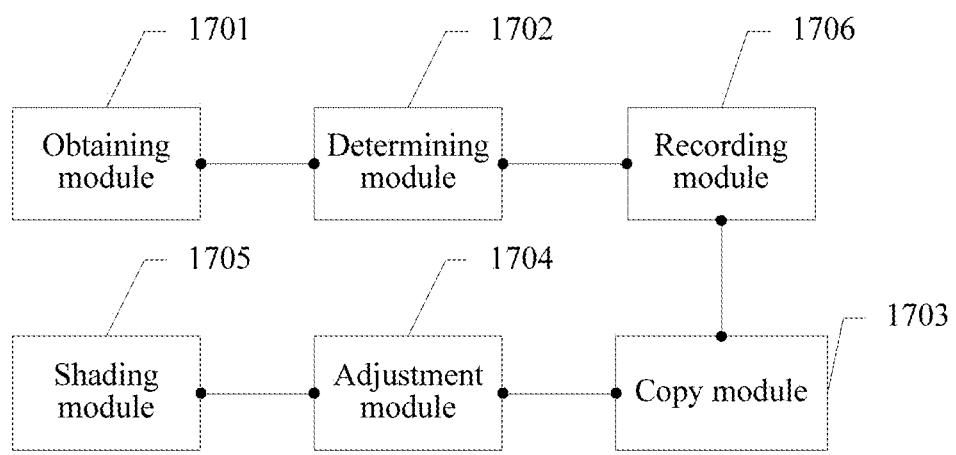
FIG. 18 is a schematic diagram of another embodiment of an image compositing apparatus according to the embodiments of the present disclosure.

Optionally, in some embodiments of the present disclosure, as shown in FIG. 18, the apparatus further includes:

a recording module 1706, configured to obtain, when animation update is performed on the simulation object, second data that is of the skeletal model of the simulation object and that is obtained after the animation update.

The copy module 1703 is further configured to obtain, from the second data, second target data corresponding to the target skeleton.

The adjustment module 1704 is further configured to adjust, based on the offset data of the target skeleton, the second target data corresponding to the target skeleton to obtain second adjusted data.

The shading module 1705 is further configured to perform shading based on the second adjusted data and the second data to obtain the simulation object composited with the accessory that is obtained after the animation.

Optionally, in some embodiments of the present disclosure, the determining module 1702 is specifically configured to establish a correspondence between the skeleton data of the accessory and the first data, so that the accessory is bound to the skeletal model; and determine, based on the correspondence between the skeleton data of the accessory and the first data, the target skeleton corresponding to the accessory.

Figure 19:
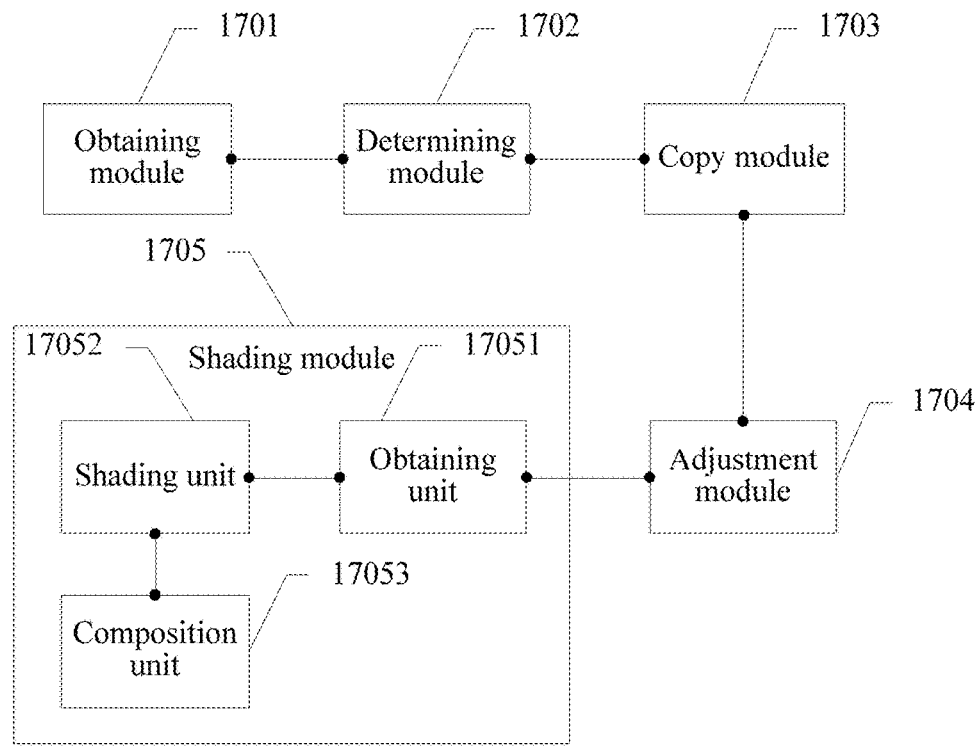
FIG. 19 is a schematic diagram of another embodiment of an image compositing apparatus according to the embodiments of the present disclosure.
Figure 20:
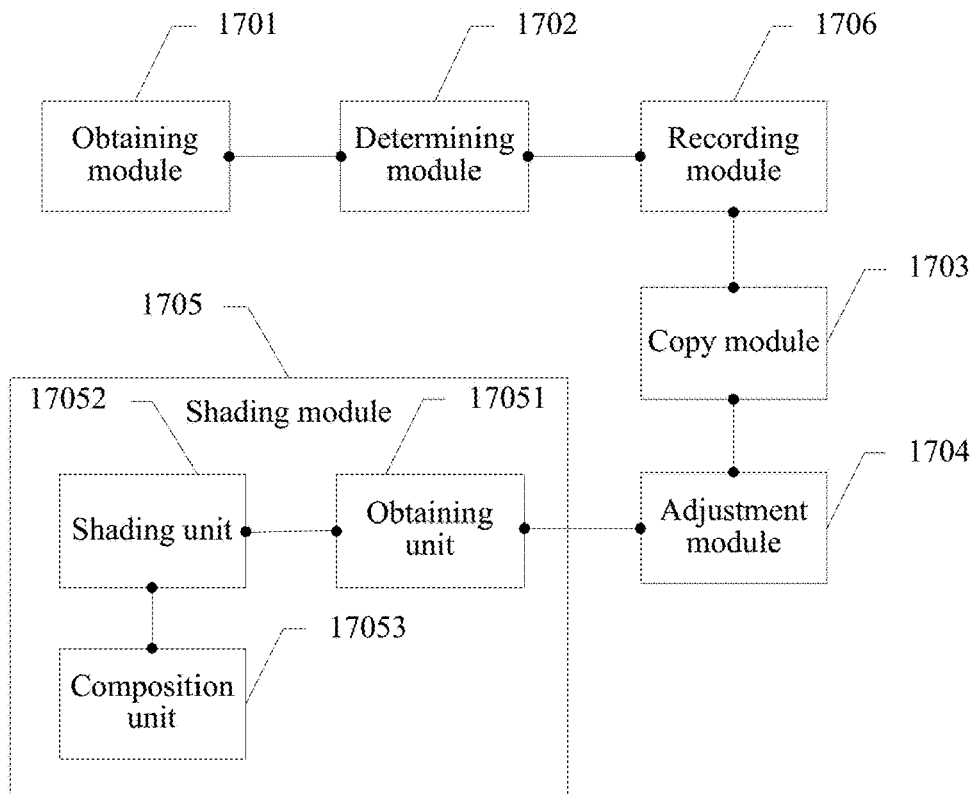
FIG. 20 is a schematic diagram of another embodiment of an image compositing apparatus according to the embodiments of the present disclosure.

Optionally, in some embodiments of the present disclosure, based on FIG. 17 or FIG. 18, as shown in FIG. 19 or FIG. 20, the shading module 1705 includes:

an obtaining unit 17051, configured to obtain skin data of the simulation object and skin data of the accessory;

a shading unit 17052, configured to: bind the skin data of the simulation object to the first data to obtain skin binding data of the simulation object, shade the skin binding data to obtain the simulation object, and shade the first adjusted data and the skin data of the accessory to obtain the accessory; and a composition unit 17053, configured to composite the simulation object and the accessory to obtain the simulation object composited with the accessory.

Figure 21:
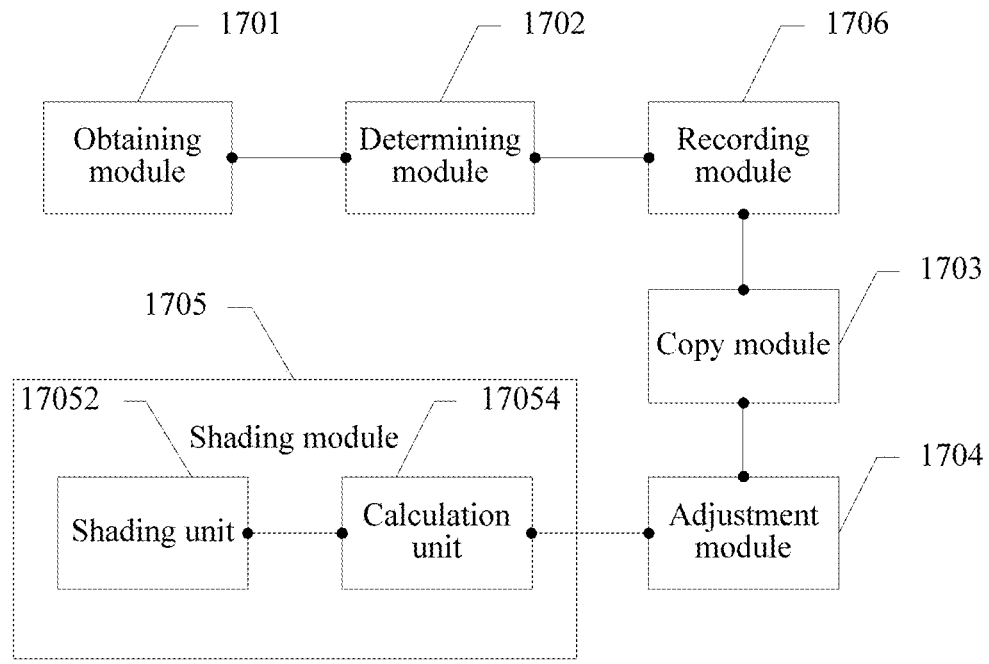
FIG. 21 is a schematic diagram of another embodiment of an image compositing apparatus according to the embodiments of the present disclosure.
Figure 22:
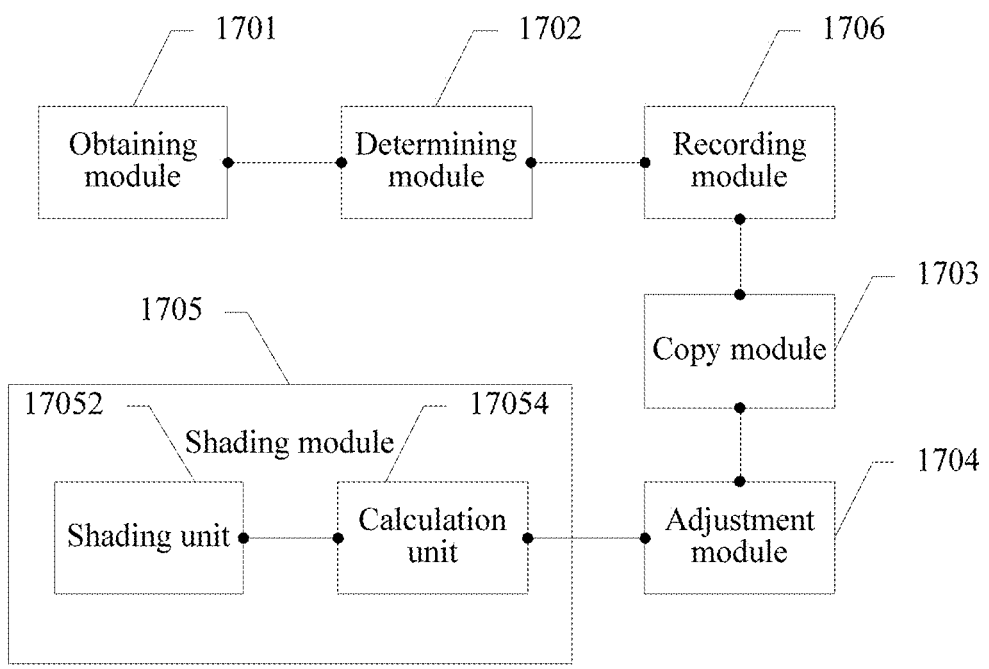
FIG. 22 is a schematic diagram of another embodiment of an image compositing apparatus according to the embodiments of the present disclosure.

Optionally, in some embodiments of the present disclosure, based on FIG. 17 or FIG. 18, as shown in FIG. 21 or FIG. 22, the skin data of the simulation object includes a plurality of vertexes, the skin data of the accessory includes a plurality of vertexes, and the shading module 1705 further includes:

a calculation unit 17054, configured to calculate first world coordinates of each vertex based on the first adjusted data and the first data; and the shading unit 17052 is configured to perform shading based on the first world coordinates of each vertex to obtain the simulation object composited with the accessory.

Optionally, in some embodiments of the present disclosure, the calculation unit 17054 is further configured to calculate second world coordinates of each vertex based on the second adjusted data and the second data; and the shading unit 17052 is further configured to perform shading based on the second world coordinates of each vertex to obtain the simulation object composited with the accessory that is obtained after the animation update.

Figure 23:
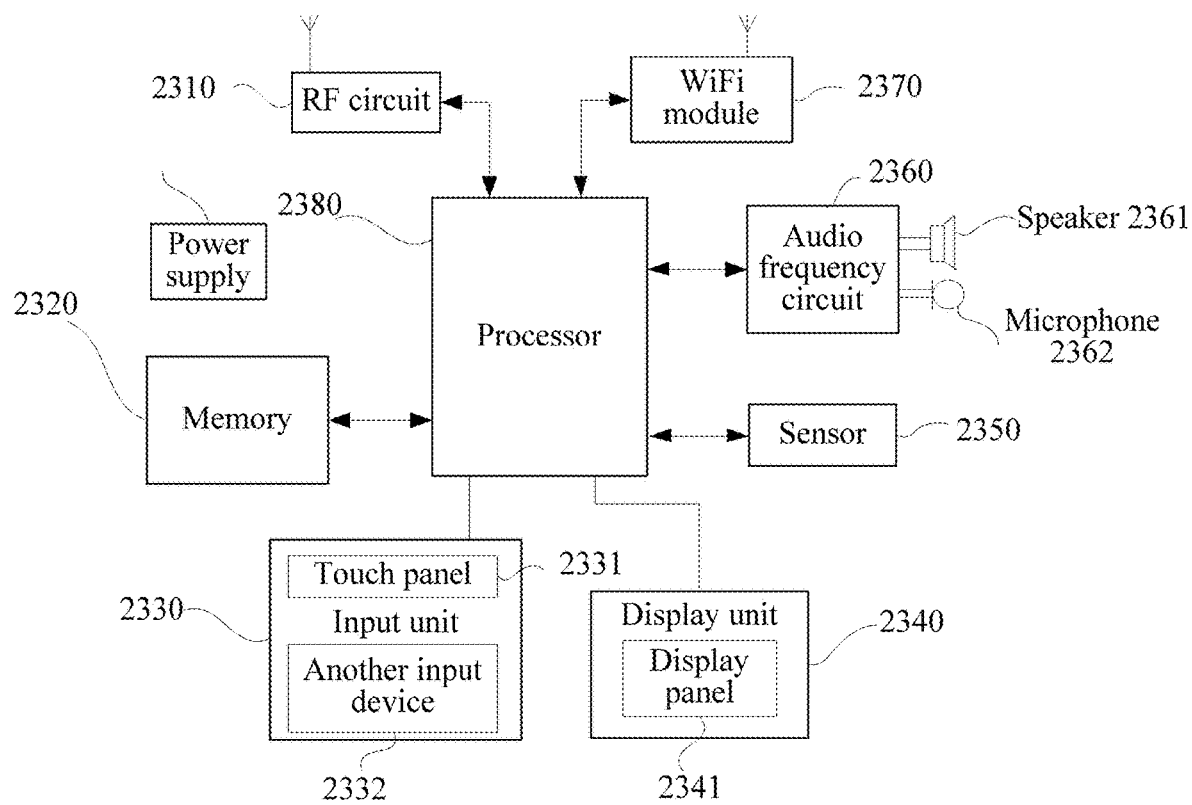
FIG. 23 is a schematic diagram of another embodiment of an image compositing apparatus according to the embodiments of the present disclosure.

An embodiment of the present disclosure further provides another image compositing apparatus, as shown in FIG. 23. For ease of description, only parts related to this embodiment of the present disclosure are shown. For specific technical details that are not disclosed, refer to the method part in the embodiments of the present disclosure. The image compositing apparatus may be integrated into a terminal for implementation, or may be an independent apparatus connected to a terminal by using a wired communications interface or a wireless communications interface.

The terminal may include any terminal device such as a mobile phone, a tablet computer, a personal digital assistant (PDA), a point of sales (POS), or an in-vehicle computer. An example in which the terminal is a mobile phone is used:

FIG. 23 is a block diagram of a partial structure of a mobile phone related to a terminal according to an embodiment of the present disclosure. Referring to FIG. 23, the mobile phone includes components such as a radio frequency (RF) circuit 2310, a memory 2320, an input unit 2330, a display unit 2340, a sensor 2350, an audio frequency circuit 2360, a Wireless Fidelity (WiFi) module 2370, a processor 2380, and a power supply 2390. A person skilled in the art may understand that the structure of the mobile phone shown in FIG. 23 does not constitute a limitation to the mobile phone, and the mobile phone may include more components or fewer components than those shown in the figure, some components may be combined, or a different component deployment may be used.

The following specifically describes the components of the mobile phone with reference to FIG. 23.

The RF circuit 2310 may be configured to receive and send a signal during an information receiving and sending process or a call process. Specifically, the RF circuit receives downlink information from a base station, then delivers the downlink information to the processor 2380 for processing, and sends related uplink data to the base station. Generally, the RF circuit 2310 includes, but is not limited to, an antenna, at least one amplifier, a transceiver, a coupler, a low noise amplifier (LNA), a duplexer, and the like. In addition, the RF circuit 2310 may further communicate with a network and another device through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 2320 may be configured to store a software program and module. The processor 2380 runs the software program and module stored in the memory 2320, to implement various functional applications of the mobile phone and data processing. The memory 2320 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 2320 may include a high speed random access memory, and may further include a non-volatile memory, such as at least one magnetic disk storage device, a flash memory, or other volatile solid-state storage devices.

The input unit 2330 may be configured to receive input digit or character information, and generate a keyboard signal input related to the user setting and function control of the mobile phone. Specifically, the input unit 2330 may include a touch panel 2331 and another input device 2332. The touch panel 2331, also referred to as a touchscreen, may collect a touch operation of a user on or near the touch panel 2331 (such as an operation of a user on the touch panel 2331 or near the touch panel 2331 by using any suitable object or accessory such as a finger or a stylus), and drive a corresponding connection apparatus according to a preset program. Optionally, the touch panel 2331 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 2380. Moreover, the touch controller can receive and execute a command sent by the processor 2380. In addition, the touch panel 2331 may be implemented as a plurality of types such as a resistive, capacitive, infrared, or surface sound wave type touch panel. In addition to the touch panel 2331, the input unit 2330 may further include the another input device 2332. Specifically, the another input device 2332 may include, but is not limited to, one or more of a physical keyboard, a functional key (such as a volume control key or a switch key), a track ball, a mouse, a joystick, and the like.

The display unit 2340 may be configured to display information input by the user or information provided for the user, and various menus of the mobile phone. The display unit 2340 may include a display panel 2341. Optionally, the display panel 2341 may be configured by using a liquid crystal display (LCD), an organic light-emitting diode (OLED), or the like. Further, the touch panel 2331 may cover the display panel 2341. After detecting a touch operation on or near the touch panel 2331, the touch panel 2331 transfers the touch operation to the processor 2380, so as to determine a type of a touch event. Then, the processor 2380 provides corresponding visual output on the display panel 2341 according to the type of the touch event. Although, in FIG. 23, the touch panel 2331 and the display panel 2341 are used as two separate parts to implement input and output functions of the mobile phone, in some embodiments, the touch panel 2331 and the display panel 2341 may be integrated to implement the input and output functions of the mobile phone.

The mobile phone may further include at least one sensor 2350 such as an optical sensor, a motion sensor, and other sensors. Specifically, the optical sensor may include an ambient light sensor and a proximity sensor. The ambient light sensor may adjust luminance of the display panel 2341 according to brightness of the ambient light. The proximity sensor may switch off the display panel 2341 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related interactive application, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio frequency circuit 2360, a speaker 2361, and a microphone 2362 may provide audio interfaces between the user and the mobile phone. The audio frequency circuit 2360 may convert received audio data into an electric signal and transmit the electric signal to the speaker 2361. The speaker 2361 converts the electric signal into a sound signal for output. On the other hand, the microphone 2362 converts a collected sound signal into an electric signal. The audio frequency circuit 2360 receives the electric signal and converts the electric signal into audio data, and outputs the audio data to the processor 2380 for processing. Then, the processor 880 sends the audio data to, for example, another mobile phone by using the RF circuit 2310, or outputs the audio data to the memory 2320 for further processing.

WiFi is a short distance wireless transmission technology. The mobile phone may help, by using the WiFi module 2370, the user to receive and send e-mails, browse a web page, access streaming media, and so on, which provides wireless broadband Internet access for the user. Although FIG. 23 shows the WiFi module 2370, it may be understood that the WiFi module 2370 is not a necessary component of the mobile phone, and when required, the WiFi module 2370 may be omitted as long as the scope of the essence of the present disclosure is not changed.

The processor 2380 is the control center of the mobile phone, and is connected to various parts of the mobile phone by using various interfaces and lines. By running or executing the software program and/or module stored in the memory 2320, and invoking data stored in the memory 2320, the processor 880 performs various functions of the mobile phone and processes data, thereby performing overall monitoring on the mobile phone. Optionally, the processor 2380 may include one or more processing units. Preferably, the processor 2380 may integrate an application processor and a modem processor. The application processor mainly processes an operating system, a user interface, an application program, and the like. The modem processor mainly processes wireless communication. It may be understood that the foregoing modem processor may alternatively not be integrated into the processor 2380.

The mobile phone further includes the power supply 2390 (such as a battery) for supplying power to the components. Preferably, the power supply may be logically connected to the processor 2380 by using a power management system, thereby implementing functions such as charging, discharging and power consumption management by using the power management system.

Although not shown in the figure, the mobile phone may further include a camera, a Bluetooth module, and the like, which are not described herein.

In this embodiment of the present disclosure, the processor 2380 included in the terminal further has the following functions: obtaining first data of a skeletal model of a simulation object and skeleton data of an accessory to be composited to the simulation object; determining, based on the first data and the skeleton data of the accessory, a target skeleton that is on the skeletal model and that corresponds to the accessory; copying first target data of the target skeleton from the first data; adjusting the first target data of the target skeleton based on preconfigured offset data of the target skeleton to obtain first adjusted data; and performing shading based on the first adjusted data and the first data to obtain the simulation object composited with the accessory.

Optionally, in some embodiments of the present disclosure, the processor 2380 may further be correspondingly configured to perform the steps shown in FIG. 7 or FIG. 11, and details are not described herein again.

A person skilled in the art may clearly understand that, for the purpose of convenient and brief description, for a specific working process of the foregoing system, device, and unit, refer to a corresponding process in the foregoing method embodiments, and details are not described herein again.

Currently, object or character emulation is related in a virtual scenario, for example, 3D modeling for an object or a character in the computer graphics or computer animation field.

Using character emulation as an example, an accessory such has a watch, a ribbon, a helmet, even a knife, a gun, and a sword may need to be mounted to the body of the character. In a conventional emulation process, the human body and the accessory are designed into an integrity, that is, the accessory is used as a part of the human body. A disadvantage thereof is that the adaptability is poor. For example, assuming that N characters all need to be equipped with a helmet, a model needs to be established for each character, and the human body and the helmet are integral in each model.

Based on the foregoing, the present disclosure provides a matching implementation method, to enable the human body and the helmet to be independent of each other, thereby flexibly implementing mounting of an accessory on a character.

Terminologies, logograms, or abbreviations that are possibly used in the present disclosure are first described as follows:

3dsMax is computer software used for manufacturing a 3D model, animation, a special effect, and the like.

Skinning is a name of attaching faces and vertexes of a model to a skeleton in 3dsMax.

A skeleton is a virtual object created for controlling a model animation in 3dsMax.

The matching implementation method and related apparatuses (a matching implementation apparatus and a terminal) that are provided in the present disclosure may be applied to the fields such as the virtual reality field, the computer graphics, and the computer animation.

For example, the method and the apparatus may be applied to emulation on an astronaut in the virtual reality field. For another example, the method and the apparatus may be applied to the computer animation field, and in particular, to role dressing and the like in a game scenario.

The foregoing matching implementation apparatus may be applied to a terminal (for example, a desktop computer, a mobile terminal, an ipad, and a tablet computer) in a form of software, or may be used as a component (for example, which may be specifically a controller/processor of the terminal) of the foregoing device in a form of hardware.

When existing in the form of software, the matching implementation apparatus may be specifically an application program, for example, a mobile phone application and a terminal application program, or may be used as a component of an application program or an operating system.

Figure 24:
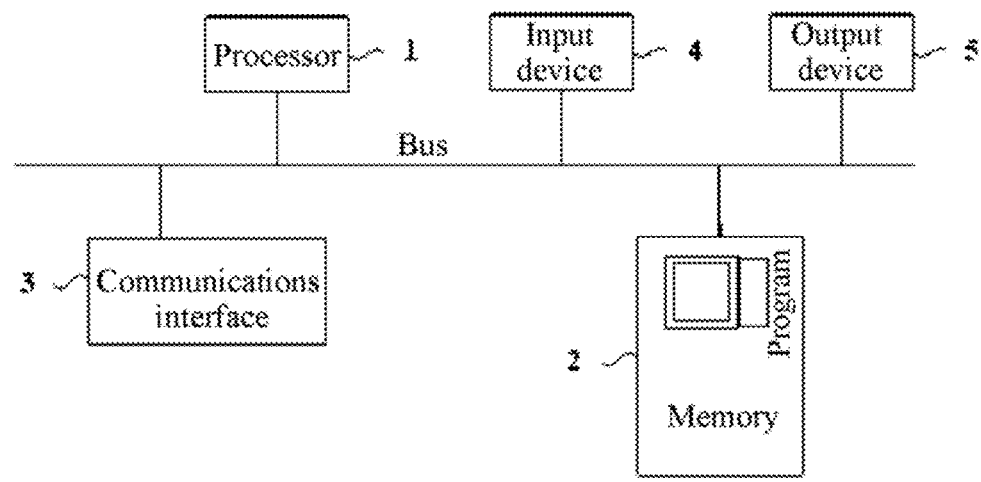
FIG. 24 is an exemplary diagram of a computer architecture of a terminal according to an embodiment of the present disclosure.

FIG. 24 shows a structure of a general-purpose computer system of the foregoing terminal.

The computer system may include a bus, a processor 1, a memory 2, a communications interface 3, an input device 4, and an output device 5. The processor 1, the memory 2, the communications interface 3, the input device 4, and the output device 5 are connected with each other by using the bus.

The bus may include a path for transmitting information between accessories in the computer system.

The processor 1 may be a general purpose processor, for example, a general purpose central processing unit (CPU), a network processor (NP for short), a microprocessor, and the like, or may be an application-specific integrated circuit (ASIC) or one or more integrated circuits configured to control program execution in the solution in the present disclosure. Alternatively, the processor 1 may be a digital signal processor (DSP), an ASIC, a field programmable gate array (FPGA) or another programmable logic component, a discrete gate or a transistor logic device, or a discrete hardware component.

The processor 1 may include a main processor (CPU), and may further include a graphics processing unit (GPU) in a graphics card.

The memory 2 stores a program for executing the technical solution in the present disclosure, and may further store an operating system and another key service. Specifically, the program may include program code, and the program code includes computer operation instructions. More specifically, the memory 2 may include a read-only memory (ROM), a static storage device of another type that can store static information and instructions, a random access memory (RAM), a dynamic storage device of another type that can store information and instructions, a magnetic disk storage, a flash, and the like.

The input device 4 may include an apparatus, for example, a keyboard, a mouse, a camera, a scanner, a light pen, a voice input apparatus, a touchscreen, a pedometer, or a gravity sensor, for receiving data and information that are entered by a user.

The output device 5 may include an apparatus, for example, a display screen, a printer, or a speaker, for allowing outputting information to the user.

The communications interface 3 may include any transceiver-type apparatus, to help to communicate with another device or a communications network such as the Ethernet, a radio access network (RAN), or a wireless local area network (WLAN).

The processor 1 executes the program stored in the memory 2 and invokes another device, to implement steps in the matching implementation method provided in the embodiments of the present disclosure.

In an example, the CPU may execute the program stored in the memory 2 and invoke another device, to implement the steps in the matching implementation method provided in the embodiments of the present disclosure.

In another example, the CPU and the GPU cooperate to work and invoke another device, to implement the steps in the matching implementation method provided in the embodiments of the present disclosure.

The embodiments of the present disclosure are further described in detail below based on the foregoing generality aspects in the present disclosure.

Figure 25:
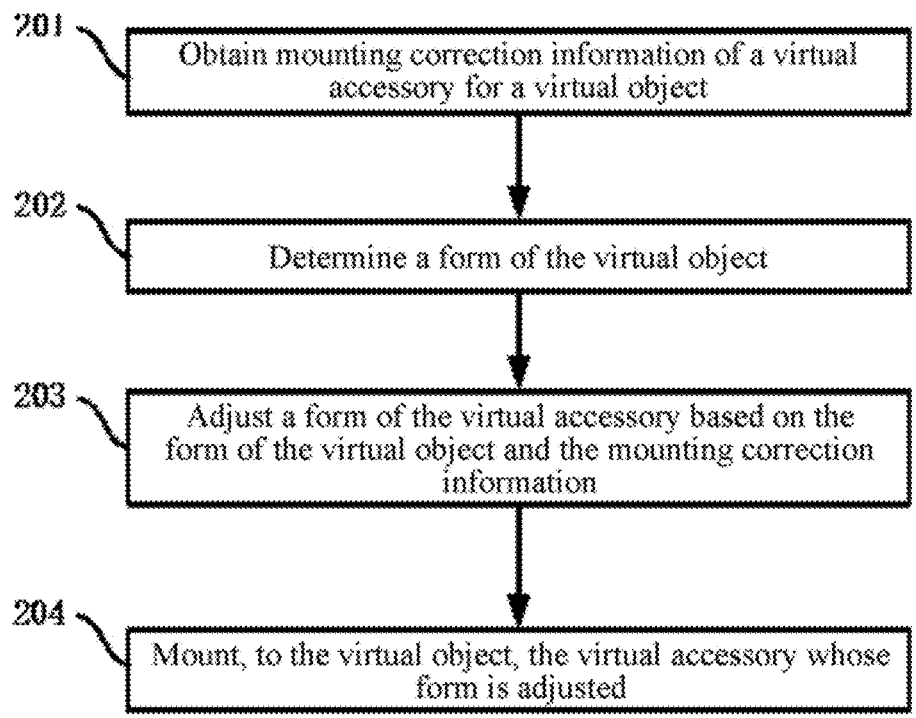
FIG. 25, FIG. 26, FIG. 28A, and FIG. 28B are exemplary flowcharts of a matching implementation method according to embodiments of the present disclosure.

FIG. 25 shows an exemplary procedure of the foregoing matching implementation method. The method shown in FIG. 25 is applied to the field or application scenario that is mentioned above, and is completed through interaction between a CPU (or a CPU and a GPU) of a terminal shown in FIG. 24 and another accessory.

The exemplary procedure includes the following steps:

201: Obtain mounting correction information of a virtual accessory for a virtual object (also referred to as a body).

The mounting correction information may be obtained by using a processor 1 (the CPU) of the terminal shown in FIG. 1.

It should be noted that the virtual accessory is independent of the virtual object. The mounting correction information is used for adapting the virtual accessory with the virtual object.

Using a game application scenario as example, the virtual accessory may be an avatar (for example, a paper doll) accessory selected by a player or an avatar accessory obtained by a player in a game process.

The virtual object may be a game character. Certainly, in another application scenario, the virtual object may alternatively be a part of an object or a human body. For example, the virtual object may be a human face in an emulation scenario.

According to a mounting manner, the virtual accessory may be a pure point-hanging avatar accessory or an avatar accessory participating in skeleton-skinning calculation.

The "point-hanging" means that the virtual accessory only moves and rotates with the character. The virtual accessory has a displacement (or an offset) and rotates relative to the virtual object only and is not deformed, that is, a form of the virtual accessory does not change.

The avatar accessory participating in the skeleton-skinning calculation presents different forms as an attitude of a skeleton of the character varies. For example, a cloak participating in the skeleton-skinning calculation presents different forms as the character changes from standing to squatting.

When the pure point-hanging accessory is manufactured, the accessory may be modeled based on a pure point-hanging requirement. Certainly, when the accessory participating in the skeleton-skinning calculation is manufactured, the accessory may be modeled based on a skeleton-skinning requirement.

In addition, in another embodiment of the present disclosure, a third-party intermediate piece such as Havok Cloth may further be used as an independent accessory for mounting. The third-party intermediate piece is generally used for auxiliary calculation.

Alternatively, the third-party intermediate piece may be integrated into a target accessory. The accessory integrated with the third-party intermediate piece is also manufactured as an independent accessory.

202: Determine a form of the virtual object.

202 may be performed by the processor 1 (the CPU or the GPU) of the terminal shown in FIG. 1.

In an example, the form of the virtual object may include a displacement (or an offset) relative to a reference object, rotation, zoom, and another form change (for example, that a character changes from standing to squatting). 203: Adjust a form of the virtual accessory based on the form of the virtual object and the mounting correction information.

203 may be performed by the processor 1 (the CPU) of the terminal shown in FIG. 1. Alternatively, the CPU and the GPU in the processor 1 cooperate to perform 203.

In an example, the form of the virtual accessory may include zoom, a displacement (or an offset) relative to a reference object (for example, a skeleton of the virtual object), rotation, and the like.

The mounting correction information is used for adapting the virtual accessory with the virtual object.

It should be noted that the mounting correction information not only can support the pure point-hanging avatar accessory in being adapted with the virtual object, but also can support the avatar accessory needing to participate in the role skeleton-skinning calculation in being adapted with the virtual object.

More specifically, the mounting correction information may include offset information, rotation information, and zoom information.

For example, an initial orientation of a point of a sword may be upward.

Mounting correction information of the sword relative to a character 1 may determine a position (which may be determined by using the offset information) on the character 1 in which the sword is hung, whether the point of the sword is upward, downward, or oblique (which may be determined by using the rotation information). The size of the sword can even be zoomed out to adapt to a relatively thin character. Certainly, the size of the sword can also be zoomed in to adapt to a character whose contour of body is relatively large (which may be determined by using the zoom information).

It should be noted that for a same virtual accessory, different virtual objects may correspond to different pieces of mounting correction information.

Still using the accessory, namely, the sword, as an example, the mounting correction information of the sword for the character 1 may determine that the sword is mounted in a position on the left shoulder of the character 1 and the point of the sword is downward. Mounting correction information of the sword for a character 2 may determine that the sword is mounted in a position on the right shoulder of the character 2 and the point of the sword is oblique.

In addition, the form of the virtual accessory is not only related to the mounting correction information, but also related to the form of the virtual object. For example, a cloak participating in the skeleton-skinning calculation presents different forms as the character changes from standing to squatting. Therefore, in this embodiment of the present disclosure, the form of the virtual accessory is adjusted with reference of the form of the virtual object and the mounting correction information.

204: Mount, to the virtual object, the virtual attachment whose form is adjusted.

204 may be performed by the processor 1 (for example, the GPU) of the terminal shown in FIG. 1 by controlling a display.

In this embodiment of the present disclosure, the form of the virtual object may be first displayed, and then the form of the virtual accessory whose form is adjusted is displayed. The process thereof is similar to that a person wears a garment. In this way, a visual effect that the virtual accessory is mounted to the virtual object can be presented.

It can be learned that in this embodiment of the present disclosure, the virtual accessory and the virtual object are independent of each other and may be respectively designed and developed, and the virtual accessory and the virtual object that are independent of each other can be adapted with each other by using the mounting correction information, so that a same virtual accessory can be adapted with different virtual objects. Compared with a current implementation in which an accessory is designed into an integrity with a human body or an object, in this embodiment of the present disclosure, the flexibility and the adaptability are greatly improved.

The technical solution in the present disclosure is further described below by using a skeleton animation scenario in the computer animation as an example.

At least a virtual framework and a mesh model bound to the virtual framework are required for implementation of a skeleton animation.

The virtual framework includes a skeleton. Using a human body as an example, the virtual framework is equivalent to a framework in the human body, and the mesh model bound to the virtual framework is equivalent to the skin of the human body. The mesh model determines the appearance of the human body or an object presented to the outside world. It can be understood that a form of the mesh model (skin) is affected by a pose of the virtual framework. The pose may also be understood as an action. For example, a T-shaped pose is that two arms flatly extend out and two legs are tightly closed, which is an action.

Figure 26:
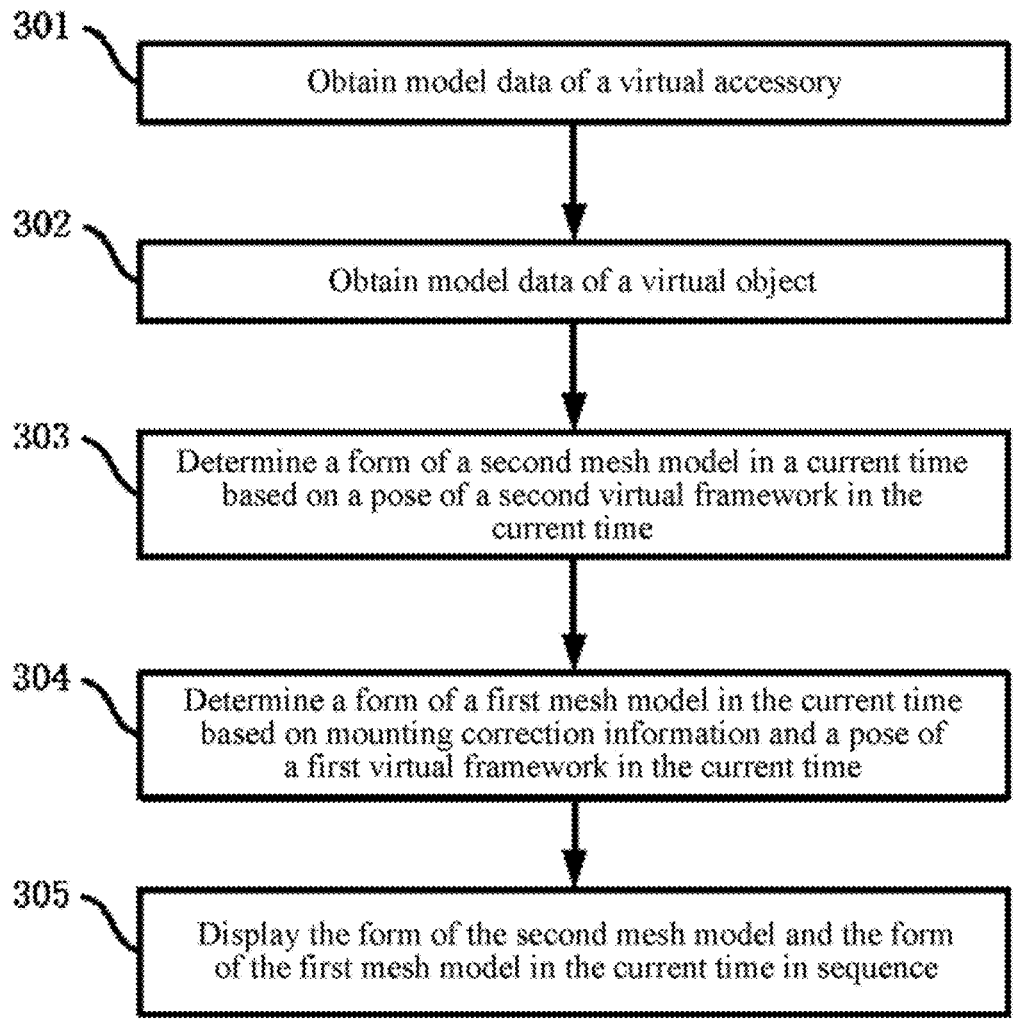

FIG. 26 shows an exemplary procedure of a matching implementation method applied to a skeleton animation scenario. The procedure is completed through interaction between a CPU (or a CPU and a GPU) in a terminal shown in FIG. 24 and another component.

The exemplary procedure includes the following steps:

301: 301: Obtain model data of a virtual accessory.

301 may be performed by a processor 1 (the CPU) of the terminal shown in FIG. 1. The model data may be stored in any storage medium, for example, a memory, that is accessible by the processor 1.

More specifically, the model data of the virtual accessory includes at least a first mesh model and a first virtual framework. The first virtual framework is a virtual framework corresponding to the virtual accessory. The first mesh model is a deformable mesh model corresponding to the virtual accessory, and a form of the first mesh model is affected by a pose of the first virtual framework.

Regardless of a pure point-hanging avatar accessory or an avatar accessory participating in character skeleton-skinning calculation, model data thereof may include a first mesh model and a first virtual framework.

It should be noted that a form of the virtual accessory may include a form of the first mesh model, in other words, a form of the virtual accessory may be represented by a form of the first mesh model. Therefore, the form of the first mesh model is calculated subsequently.

For a game application scenario, the virtual accessory may be an avatar accessory such as a helmet, a ribbon, a cloak, or a sword accessory.

302: Obtain model data of a virtual object.

302 may be performed by the processor 1 (the CPU) of the terminal shown in FIG. 24. The model data may be stored in any storage medium, for example, the memory, that is accessible by the processor 1.

The model data of the virtual object may include a second virtual framework, a second mesh model, and mounting correction information of the virtual accessory for the virtual object.

The second virtual framework is a virtual framework corresponding to the virtual object. It should be noted that the first virtual framework is a part of the second virtual framework. For example, assuming that the virtual object is a person, a (second) virtual framework of the virtual object is an entire virtual framework of the person. It is assumed that a (first) virtual framework corresponding to a cloak accessory includes a shoulder seam and a skeleton on the back, and the shoulder seam and the skeleton on the back belong to a part of the entire framework of the person.

The second mesh model is a deformable mesh model corresponding to the virtual object, and a form of the second mesh model is affected by a pose of the second virtual framework. It should be noted that a form of the virtual object may include a form of the second mesh model, in other words, a form of the virtual object may be represented by a form of the second mesh model. Therefore, the form of the second mesh model is calculated subsequently.

For a game application scenario, the virtual object may be different game characters, for example, a military officer wearing a heavy armor, a civilian wearing a flowing garment, and an alien-nation warrior dressed strangely. The model data of the virtual object may be stored in a 3dsmax file (a character manufacture file) of a character model.

As mentioned above, the mounting correction information of the virtual accessory varies with different virtual objects. The mounting correction information of the virtual accessory for the virtual object is manufactured in a model of the virtual object and is a part of the model data of the virtual object. In addition, the mounting correction information may be added, as an additional node, to a 3dsmax file of a character.

The additional node may be created by different max scripts based on an accessory classification (for example, a cloak type and a waist-side weapon type). An art design staff may create all or some of the nodes based on a requirement (where if some nodes are created, remaining modes that are not created still use a default value). These nodes determine that the virtual accessory may be mounted in different positions based on different characters and has different rotation angles and zoom ratios.

For the third-party intermediate piece, there may be different additional data, for example, cloth crash data of Havok Cloth, based on different characters. The additional data may also be stored, as additional nodes, in the character manufacture file.

303: Determine a form of a second mesh model in a current time based on a pose of a second virtual framework in the current time.

In this embodiment of the present disclosure, the pose of the second virtual framework may be represented by a status of a skeleton included in the second virtual framework. 303 may include:

determining the form of the second mesh model in the current time based on the status of the skeleton included in the second virtual framework in the current time.

How to determine the form of the second mesh model based on the status of the skeleton in the second virtual framework is described subsequently.

It should be noted that 303 is refining of 202. 303 may be performed by the processor 1 (the CPU) of the terminal shown in FIG. 24. Alternatively, the CPU and the GPU in the processor 1 cooperate to perform 303.

304: Determine a form of a first mesh model in the current time based on mounting correction information and a pose of a first virtual framework in the current time.

It should be noted that because the first virtual framework is a part of the second virtual framework, when the pose of the second virtual framework is determined, the pose of the first virtual framework is also determined.

After the pose of the first virtual framework is determined, the form of the first mesh model in the current time may be determined based on the mounting correction information and the pose of the first virtual framework in the current time.

The pose of the first virtual framework may be represented by a status of a skeleton included in the first virtual framework. 304 may include: determining the form of the first mesh model in the current time based on the mounting correction information and the status of the skeleton included in the first virtual framework in the current time.

It should be noted that for an accessory participating in skinning calculation, a position, an orientation (rotation), and even a shape change of the accessory may be calculated based on the mounting correction information and the status of the skeleton included in the first virtual framework in the current time. For a pure point-hanging accessory, an offset and rotation of the accessory relative to the skeleton may be calculated based on the mounting correction information. The position (offset), the orientation (rotation), and even the shape change all belong to the form of the accessory.

How to determine the form of the first mesh model based on the status of the skeleton in the first virtual framework is described subsequently.

It should be noted that 304 is refining of 203. 304 may be performed by the processor 1 (the CPU) of the terminal shown in FIG. 24. Alternatively, the CPU and the GPU in the processor 1 cooperate to perform 304.

305: Display the form of the second mesh model and the form of the first mesh model in the current time in sequence.

305 is refining of 204. 305 may be performed by the processor 1 (the GPU) of the terminal shown in FIG. 24.

In this embodiment, how to adapt the virtual object with the virtual accessory based on the mounting correction information in the skeleton animation is described. This solution has a very low requirement on modification of original data while ensuring a displaying effect, and can be compatible with integration of the third-party intermediate piece such as Havok Cloth.

The principle of the skeleton animation is described below in more details.

A skeleton animation generally includes a virtual framework (a skeleton layer), a mesh model bound to the virtual framework, and a series of key frames.

One key frame corresponds to a new pose of the framework, and a framework pose between two key frames may be obtained through interpolation. This is because a problem of action unsmoothness may be caused if only playing of the key frames is performed. A solution is inter-frame smooth interpolation.

In the skeleton animation, a mesh is not directly placed into a world coordinate system. The mesh is merely used as a skin and is attached to a skeleton. A virtual skeleton of a virtual object or a virtual accessory truly determines a position and an orientation of the virtual object or the virtual accessory in the world coordinate system.

A form of a mesh model is represented by a position (coordinates) of a mesh vertex.

Figure 27A:
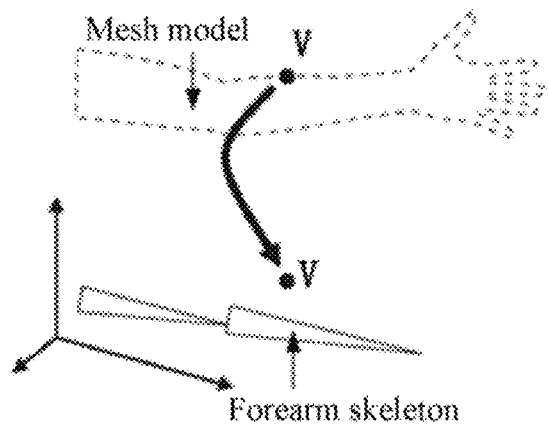
FIG. 27A and FIG. 27B are exemplary diagrams showing that a skeleton affects a mesh vertex according to embodiments of the present disclosure.
Figure 27B:
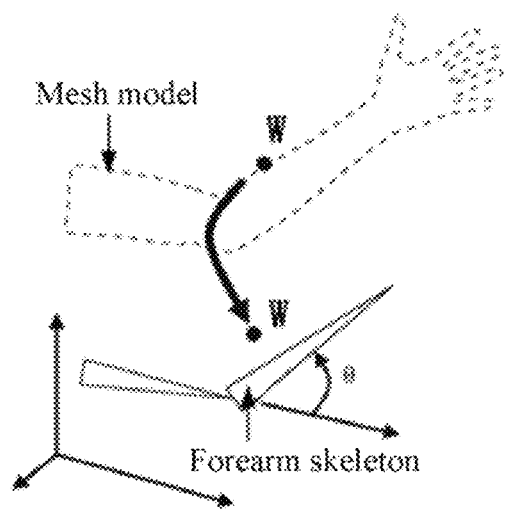

Referring to FIG. 27A and FIG. 24 FIG. 27B, FIG. 27A and FIG. 24 FIG. 27B exemplarily show a mesh model and a skeletal model of an arm. It is assumed that a position of a vertex in the mesh model is V, and the position of the vertex is affected by a position and an orientation of a skeleton of a forearm.

FIG. 24 FIG. 27B shows that the position of the vertex is changed from V to W after the skeleton of the forearm rotates by an angle.

A virtual framework includes a series of discrete joints connected to each other through a parent-child relationship.

For a skeleton animation, using a virtual object as an example, setting a location and an orientation of the virtual object is actually setting of a location and an orientation of a skeleton of the virtual object. A location and an orientation of each skeleton are calculated based on a transform relationship between a parent skeleton and a child skeleton in a skeleton layer structure, and then coordinates of each vertex in a world coordinate system are calculated based on binding between the skeleton and the vertex in the mesh, to render the vertex and finally to obtain a displayed virtual object.

For ease of modeling, direction information (a location and an orientation) of each joint is defined in parent space of the joint, and child space is also defined for each joint.

There is a skeleton between joints. Generally, a virtual framework includes only one root skeleton.

An upper-arm skeleton, a forearm skeleton, and a finger skeleton are used as an example. A clavicle is a joint and is an original point of an upper arm. Similarly, an elbow joint is an original point of a forearm, and a wrist joint is an original point of the finger skeleton. The joint not only determines a position of skeleton space, but also is a rotation and zoom center of the skeleton space.

A skeleton may be expressed by using a 4×4 matrix because a translation component included in the 4×4 matrix determines a position of a joint connected to the skeleton (determining a position of an original point of the skeleton), and a rotation component and a zoom component determine rotation and zoom of the skeleton space.

Using a forearm skeleton as an example, a position of an original point thereof is in a position in a coordinate system in upper-arm skeleton space. For an upper-arm skeleton, there is child space, that is, the forearm skeleton, in a position in coordinate space of the upper-arm skeleton.

Rotation of the forearm about the wrist joint is actually rotation of the forearm coordinate space. Therefore, the child space (the finger skeleton coordinate space) included in the forearm coordinate space also rotates about the wrist joint. The child space moves with the parent space, like rotation of people along with the earth.

A difference from an actual biological skeleton is that the skeleton herein is not an substantial bone. Therefore, when the forearm rotates, only an orientation of the coordinate space changes.

An object may perform translation transform, rotation, and zoom transform in a coordinate system. A child skeleton can also perform these transforms in a coordinate system of a parent skeleton to change a position, an orientation, and the like of the child skeleton in the coordinate system of the parent skeleton.

The 4×4 matrix can indicate all the foregoing three transforms (balancing, rotation, and zoom). Therefore, generally, when transform of a child skeleton in a coordinate system of a parent skeleton of the child skeleton is described, a transform matrix is used. A position of the skeleton in the coordinate system of the parent skeleton is determined by using the transform matrix.

The transform matrix (where a role is to transform a vertex from skeleton space to upper-layer space) is based on parent skeleton space thereof, and only transform of a root skeleton is based on world space. Therefore, a transform matrix (also referred to as a global matrix), that is, a combined transform matrix (where a transform matrix of a skeleton in the world space may be indicated by using C) of the skeleton in the world space is obtained through transform from a lower layer to an upper layer one by one. An implementation thereof is multiplying a row vector by a matrix, that is, C=Mbone*Mfather*Mgrandpar* ... *Mroot.

That is, transform from the skeleton space to the word space may be implemented by using the transform matrix of the skeleton in the world space. Therefore, coordinates in the world space may be transformed to skeleton space of a skeleton by using an inverse matrix (an offset matrix) of the matrix.

When a mesh model is established in 3dsMax, mesh model space and the world space overlap. In other words, in this case, the world space is actually used as mesh space.

When a skeleton is added, the skeleton is placed into the world space, and a relative position of the skeleton is adjusted to match the mesh, to obtain an initial pose of a framework (where for example, a mesh model needs to be manufactured into a T pose with two arms extending flatly and straightly, and the skeleton also needs to match the pose).

During manufacturing, the framework matches the mesh. Therefore, coordinates of a vertex in a mesh model in the world space may be transformed into skeleton space of a skeleton by using the foregoing offset matrix.

In an animation key frame, a transform matrix of each skeleton in the key frame relative to a coordinate system of a parent skeleton may be indicated. Alternatively, the animation key frame may record rotation, translation, and zoom of each joint relative to a bound pose.

Based on the foregoing descriptions, in this embodiment of the present disclosure, the matching implementation method is described by using a game application scenario as an example. There may be various characters in different styles in the game. These characters have great differences in contour of body and have different garments and decorations. How to make these characters behave reasonably when wearing a same avatar accessory and to avoid an unacceptable displaying problem are problems to be resolved in this embodiment of the present disclosure.

Figure 28A:
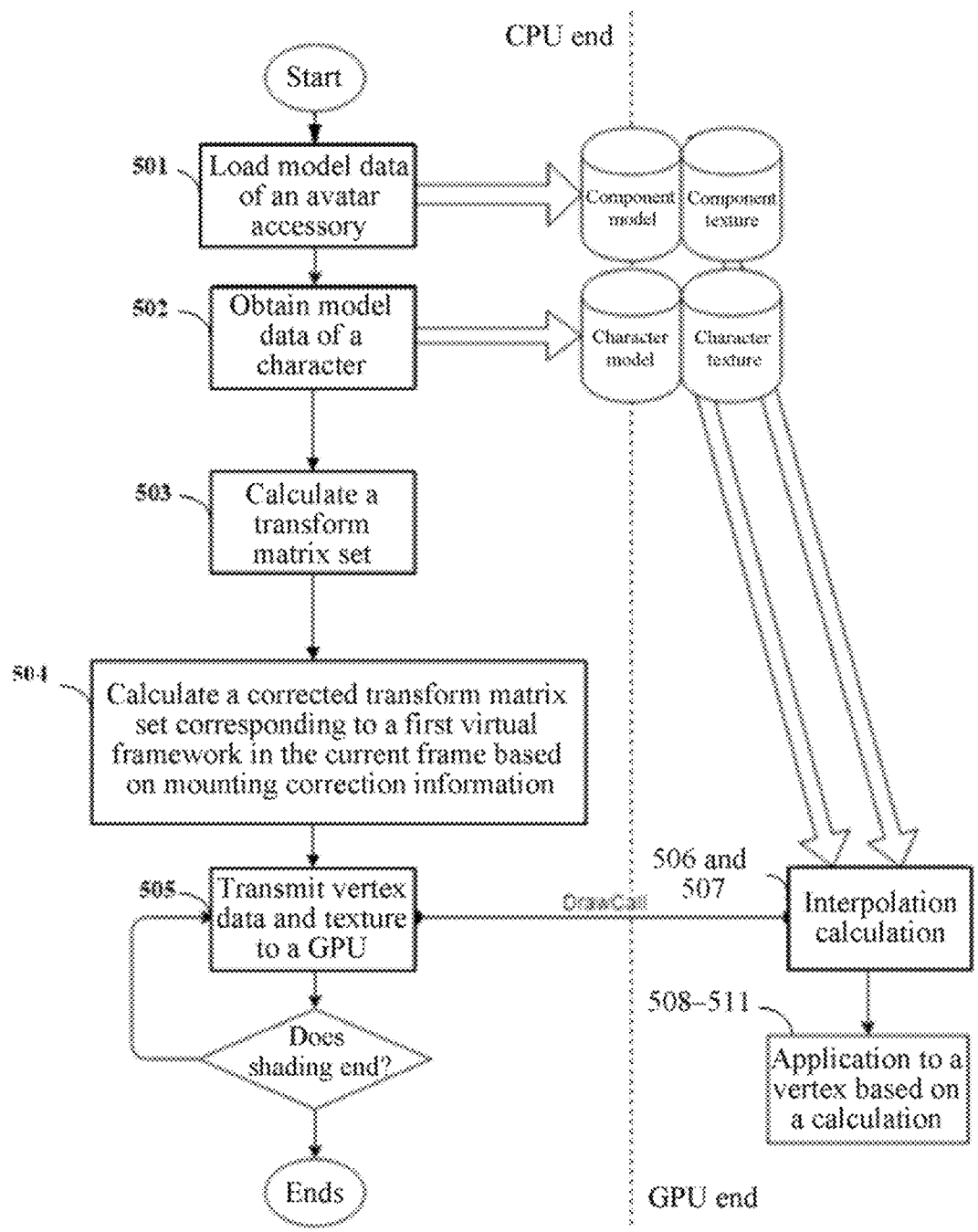
Figure 28B:
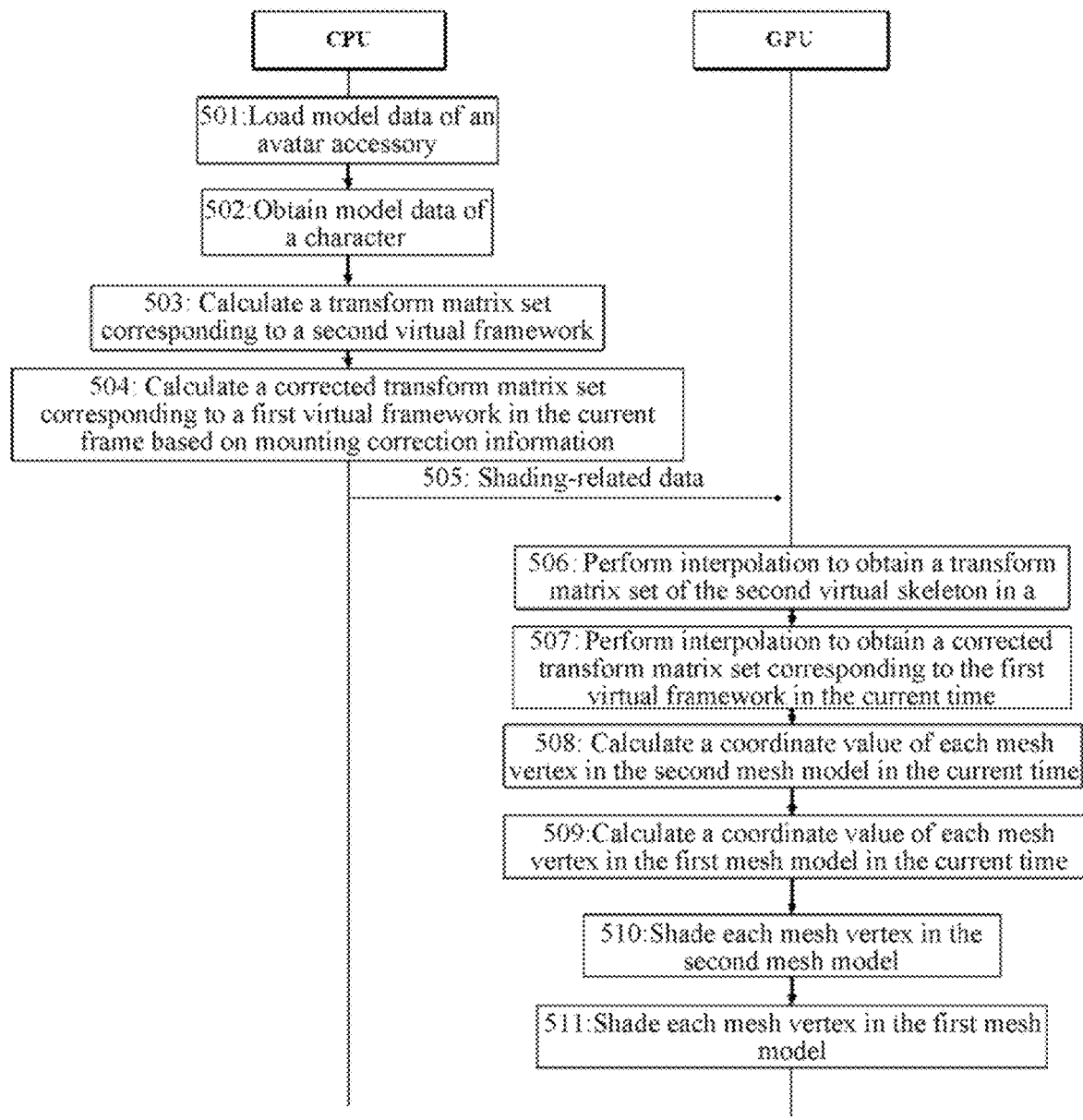

To resolve the problems, refer to FIG. 28A or FIG. 28B. FIG. 28A or FIG. 28B shows another exemplary procedure of a matching implementation method. The method shown in FIG. 28A or FIG. 28B may be applied to a skeleton animation scenario, and is completed through interaction between a CPU and a GPU in a terminal shown in FIG. 1.

The method may include the following steps:

501: The CPU loads model data of an avatar accessory.

The model data of the avatar accessory may include network data (including vertex data) of a first mesh model and skeleton information of a first virtual framework.

Each mesh in a mesh model is generally of a triangle or another polygon.

The mesh data includes the vertex data (a vertex table) and index data. In addition to including information such as a position, a normal vector, a material, and texture, each vertex in the vertex table points out a skeleton affecting the vertex and an effect weight. Vertexes forming each polygon may be determined by using the index data.

The skeleton information includes the number of all skeletons in the first virtual framework and specific information of each skeleton.

501 is similar to the foregoing 301. For related details, refer to the descriptions in 301. Details are not described herein again.

502: The CPU obtains model data of a character (that is, a virtual object).

The model data of the character may include skeleton information of a second virtual framework, vertex data of a second mesh model, and mounting correction information of the virtual accessory for the virtual object.

For the skeleton information and the vertex data, refer to the descriptions in 501, and details are not described herein again.

The mounting correction information may exist as an additional node (a mounting point).

In reality, one character may be mounted with a plurality of avatar accessories, each avatar accessory may correspond to a group of mounting points, and any group of mounting points includes at least one mounting point.

Certainly, the foregoing mounting point is not displayed to a player.

One mounting point corresponds to (affects) some vertexes in a mesh model of the avatar accessory.

An avatar accessory corresponding to each mounting point is declared. For example, a prefix of a name of the mounting point may indicate an avatar accessory the mounting point is used for mounting.

One mounting point may be bound to one or more skeletons. There is a parent-child relationship between a mounting point and a skeleton to which the mounting point is bound, and the mounting point is a child node. The parent-child relationship is similar to a parent-child between skeletons.

In an animation, the skeleton moves. Regardless of how the skeleton moves, an offset, rotation, and zoom of the mounting point relative to the skeleton remain unchanged.

Figure 29A:
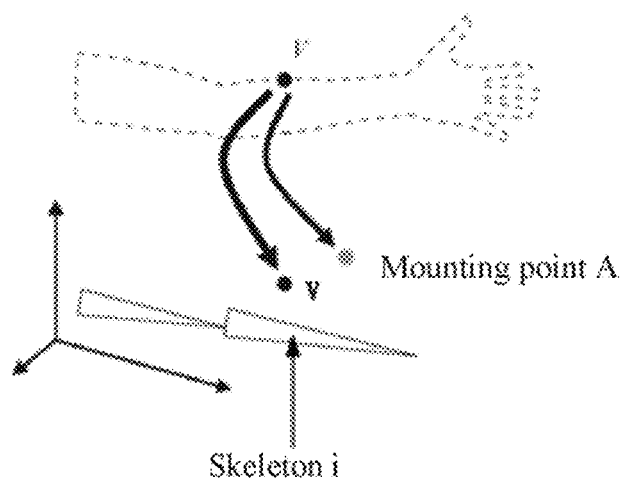
FIG. 29A and FIG. 29B are exemplary diagrams of showing that a skeleton affects a mounting point according to embodiments of the present disclosure.
Figure 29B:
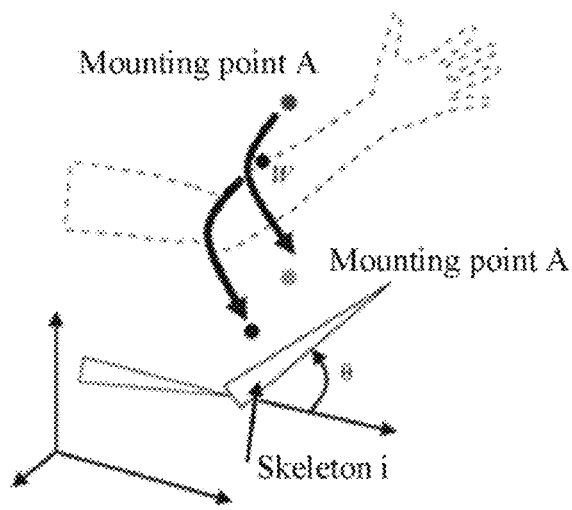

For example, refer to FIG. 29A and FIG. 29B. It is assumed that a position of a vertex in a mesh model is V, and the vertex corresponds to a mounting point A. FIG. 29B shows that after a skeleton i rotates by an angle, the position of the vertex changes from V to W, and coordinates of the mounting A also correspondingly changes.

In this embodiment, the mounting point (the mounting correction information) may include an offset value, a rotation angle, and a zoom ratio. Generally, the offset value, the rotation angle, and the zoom ratio are stored by using a 4×4 matrix or a 4×3/3×4 matrix.

Actually, the offset value is an offset value of the mounting point relative to one or more skeletons.

A mounting point is bound to some mesh vertexes in the first mesh model. Therefore, the offset value may also be considered as an offset value of some mesh vertexes relative to a skeleton in the first virtual framework.

For example, if the mounting A is bound to mesh vertexes 0-100, and the mounting point A is bound to a skeleton 1, the offset value may be considered as an offset value of the mesh vertexes 0-100 relative to the skeleton 1.

Similarly, the rotation angle is a rotation angle of the mounting point relative to one or more skeletons in the first virtual framework, and may also be considered as a rotation angle of the some mesh vertexes in the first mesh model relative to the one or more skeletons in the first virtual framework.

The zoom ratio of the first mesh model is a zoom ratio of the mounting point relative to an original component size, and may also be considered as a zoom ratio of the mesh vertex in the first mesh model relative to the original component size.

In addition, the mounting point (the mounting correction information) may further include constraint information.

The constraint information is used as an additional parameter of component mounting, and different pieces of information may be stored based on different actual application cases.

For example, when applied to a character equipment system in a game, the constraint information may include amplitude constraint information. The amplitude constraint information may be used for storing an acceptable offset range of the mounting point. In this way, when wearing a component, the player may slightly adjust (adjusting vertically or horizontally) an offset position of the component.

For another example, for an elastically following mounting component, the constraint information may include elasticity constraint information. The elasticity constraint information helps calculate a position of the component without following a main body to move stiffly.

503: The CPU calculates a transform matrix set corresponding to a second virtual framework in a current frame.

As described above, in an animation key frame, a transform matrix of each skeleton in the key frame relative to a coordinate system of a parent skeleton may be indicated. Alternatively, the animation key frame may record rotation, translation, and zoom of each joint in a joint state relative to a bound pose (the T shape described above).

Transform matrices that correspond to skeletons in the second virtual framework and that is in world space may be calculated based on information in the animation key frame. A set of the transform matrices is the transform matrix set.

For convenience, a transform matrix that corresponds to the ith skeleton in the second virtual framework in the current frame and that is in the world space or original model space is indicated by using matrix x[i]. A status of each skeleton included in the second virtual framework may be represented by the set of transform matrices (the transform matrix set) of all the skeletons.

504: Calculate a corrected transform matrix set corresponding to a first virtual framework in the current frame based on mounting correction information (a mounting point).

The first virtual framework is a part of the second virtual framework. Therefore, a transform matrix set corresponding to the first virtual framework in the current frame may be extracted from the transform matrix set corresponding to the second virtual framework in the current frame.

Actually, the mounting point and a bound skeleton are in a parent-child relationship. The mounting point may inherit a transform matrix of a parent node in the world space, then the transform matrix is multiplied by a matrix including an offset value, a rotation angle, and a zoom ratio of the mounting point, to obtain a transform matrix (also referred to as a corrected transform matrix) corresponding to the mounting point.

In addition, one mounting point is bound to mesh vertexes of one or more virtual accessories, and one virtual accessory corresponds to a group of mounting points. Therefore, a set of corrected transform matrices of the mounting point is the corrected transform matrix set corresponding to the first virtual framework in the current frame.

For convenience, a transform matrix that corresponds to the $j^{th}$ skeleton in the second virtual framework in the current frame and that is in the world space is indicated by using matrix[j].

A corrected transform matrix that corresponds to the $j^{th}$ skeleton in the second virtual framework in the current frame and that is in the world space may be indicated by using $matrix[j]^t$. If $matrix[j]_{relative}$ indicates a transform matrix of a corrected point in the current frame relative to the $j^{th}$ skeleton in the second virtual framework, $matrix[j]^t = matrix[j]_{relative} * matrix[j]$.

505: The CPU transmits shading-related data of the character and the avatar accessory to a GPU.

More specifically, the shading-related data may include vertex data of the character and the avatar accessory, matrix [i], $matrix[j]^t$, vertex texture data of the first mesh model, and vertex texture data of the second mesh model.

During actual running, the foregoing data may be transmitted in batches. For example, the vertex data of the character, matrix[i], and the vertex texture data of the second mesh model may be first transmitted, and then the vertex data of the avatar accessory, $matrix[j]^t$, and the vertex texture data of the first mesh model are transmitted.

It should be noted that each process of preparing data and instructing the GPU to perform shading is referred to as a draw call.

Generally, an object having a mesh and carrying a material after shading once uses a draw call once.

506: Perform interpolation based on transform matrix sets corresponding to the second virtual frame in a previous key frame and the current frame to obtain a transform matrix set of the second virtual framework in a current time.

A problem of action unsmoothness may be caused if only playing of the key frames is performed. A solution is to perform inter-frame smooth interpolation between two neighboring key frames.

Assuming that an animation has a time of 10 s, and a key frame is set at each integer second, a framework status between integer seconds is obtained through inter-frame interpolation.

A basic idea of interpolation is that a time t is given, two key frames between which t is located are found and are assumed as p and q, and then a status of a skeleton in the time t is calculated based on a joint status (or a skeleton status) recorded by p and q and the time t.

There are lots of interpolation methods, for example, linear interpolation, hermite (hermite) interpolation, and spherical interpolation.

Hermite interpolation may be selected for translation, and quaternion spherical interpolation is used for rotation.

As described above, matrix[i] indicates the transform matrix that corresponds to the ith skeleton in the current frame and that is in the world space, and matrix[i] includes translation, rotation, and zoom.

For convenience of naming, a transform matrix that corresponds to the ith skeleton in the current time t and that is in the world space may be indicated by using $matrix[j]^t$.

507: Perform interpolation based on corrected transform matrix sets corresponding to the first virtual framework in the previous key frame and the current frame to obtain a corrected transform matrix set corresponding to the first virtual framework in the current time.

507 is similar to 506, and details are not described herein again.

For convenience of naming, a transform matrix that corresponds to the jth skeleton in the current time t and that is in the world space may be indicated by using matrix$[j]'^t$.

508: Calculate a coordinate value of each mesh vertex in the second mesh model in the current time based on the transform matrix set of the second virtual framework in the current time.

For a mesh vertex s in the second mesh model, a coordinate value thereof may be calculated in the following manner:

First, all skeletons affecting the vertex s are found, and the number of all the skeletons affecting the vertex s may be indicated by using bones. Then, a new position of the vertex s under independent action of each skeleton is calculated, and there are bones new positions in total. At last, weighted summation is performed on all the new positions based on weights of the skeletons to the vertex s. It should be noted that a sum of all the weights should be 1.

The coordinate value of the vertex s may be calculated by using a classic skeleton animation calculation formula. The formula is as follows:

$$v' = \sum_{pebones} \text{weight}(p) \times \text{matrix}[p]' \times \text{matrix}[p]_{bindpose}^{-1} \times v_{bindpose}$$

$v^t$ indicates a position of the vertex s in a current time t.
$v_{bindpose}$ indicates an initial position of the vertex s.
weight$[p]$ indicates a weight of the vertex s to the $p^{th}$ skeleton.
matrix$[j]^t$ indicates a transform matrix that corresponding to the $p^{th}$ skeleton and that is in the world space in the current time.
matrix$[p]_{bindpose}^{-1}$ indicates an offset matrix of the vertex s relative to space of the pth skeleton, and the purpose of right-multiplying matrix$[p]_{bindpose}^{-1}$ is to map a transform information matrix of the vertex to the space of the pth skeleton.

509: Calculate a coordinate value of each mesh vertex in the first mesh model in the current time based on the corrected transform matrix set.

Similar to 508, for a mesh vertex R in the first mesh model, a coordinate value thereof may be calculated in the following manner:

First, all skeletons affecting the vertex R are found, and the number of all the skeletons affecting the vertex R may be indicated by using bones1. Then, a new position of the vertex R under independent action of each skeleton is calculated. At last, weighted summation is performed on all the new positions based on weights of the skeletons to the vertex R. It should be noted that a sum of all the weights should be 1.

The coordinate value of the vertex R may be calculated by using a classic skeleton animation calculation formula. The formula is as follows:

$$w' = \sum_{qebones1} \text{weight}(q) \times \text{matrix}[q]'' \times \text{matrix}[q]_{bindpose}^{-1} \times w_{bindpose}$$

$w^r$ indicates a position of the vertex R in a current time t.
$w_{bindpose}$ indicates an initial position of the vertex R.
weight$(q)$ indicates a weight of the vertex R to the $q^{th}$ skeleton.
matrix$[q]^{rt}$ indicates a corrected transform matrix that corresponds to the qth skeleton and that is in the world space in the current time.
matrix$[q]_{bindpose}^{-1}$ indicates an offset matrix of the vertex R relative to space of the qth skeleton, and the purpose of right-multiplying matrix$[q]_{bindpose}^{-1}$ is to map a transform information matrix of the vertex to the space of the qth skeleton.

510: Shade each mesh vertex in the second mesh model based on the coordinate value and texture data of each mesh vertex in the second mesh model in the current time.

511: Shade each mesh vertex in the first mesh model based on the coordinate value and texture data of each mesh vertex in the first mesh model in the current time.

In addition, it should be noted that currently, an avatar accessory is approximately classified into two types based on an application manner: an avatar accessory moving and rotating with a character in a point-hanging manner only, and an avatar accessory performing skinning calculation with a character skeleton.

The first type of avatar accessory is generally used as an independent object and is mounted to a particular skeleton of a character during running, and rigid-body calculation is performed in a parent-child relationship.

The avatar accessory in a pure point-hanging manner is an independent object. Therefore, there is no conflict between the avatar accessory and a contour of body (that is, being fat, short, tall, or thin) of the character. However, the avatar accessory can only be mounted in a same position, and is restricted by appearance design of an original character. An acceptable visual effect on a character A may not be suitable for a character B because some additional models are added to an originally reserved position.

For the second type of avatar accessory, generally, a character is divided into a plurality of parts, and then the parts are replaced or combined into a basic mesh model of an original character based on game configuration or a selection of a player during running, to form a complete model through combination to participate in skeleton-skinning calculation.

During running, this type of component needs to be combined with another component and a basic mesh model. Therefore, requirements are imposed on a weight of a component model and a space position during manufacture. In addition, component texture also needs to comply with a rule during manufacture to ensure that combination of the texture can be quickly and correctly completed during running.

In addition, the same as the pure point-hanging manner, the avatar component participating in skinning calculation of the character skeleton cannot avoid impact of covering on the component by additional model data in an original model.

In this embodiment of the present disclosure, a same virtual accessory may be specified to be mounted in different positions based on different characters by using the mounting information. In addition to avoiding the impact of covering on the component by the character appearance, the component may be adapted to a most appropriate position on the role character.

Figure 30:
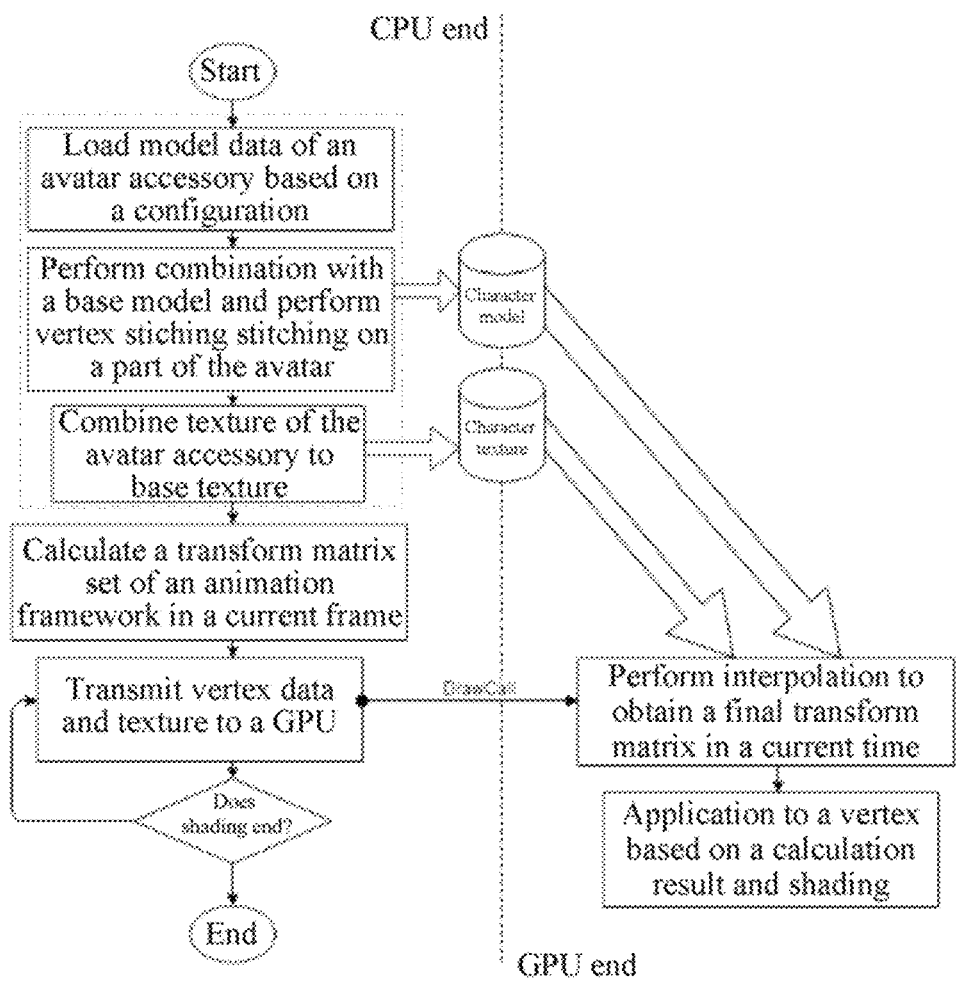
FIG. 30 is a flowchart of an existing skeleton skinning according to an embodiment of the present disclosure.

FIG. 30 shows an existing skeleton skinning manner.

It may be learned through comparison that after the solution is adopted, the CPU needs to additionally calculate the corrected transform matrix set of the avatar accessory in the current frame, and then transmits the corrected transform matrix set to the GPU for calculation and application. However, relatively, preprocessing (model combination/texture combination) of the model data of the character is not required any more.

It can be learned through comparison that this solution mainly centers on the CPU end, and there is basically no change on the GPU end. In addition, only a small amount of additional calculation is required in each frame on the CPU end.

In this technical solution, a problem of visual effect presentation that may be caused because the avatar accessory is applied to various characters having different contours of bodies and great difference on original appearances is resolved while ensuring simple and convenient data manufacture. In addition, there is desirable integration compatibility of the third-party intermediate piece such as Havok Cloth. This greatly helps manufacture various avatar components. A player can randomly match character appearances in various styles by using a function implemented in the solution, thereby improving the enjoyment of a game.

Figure 31:
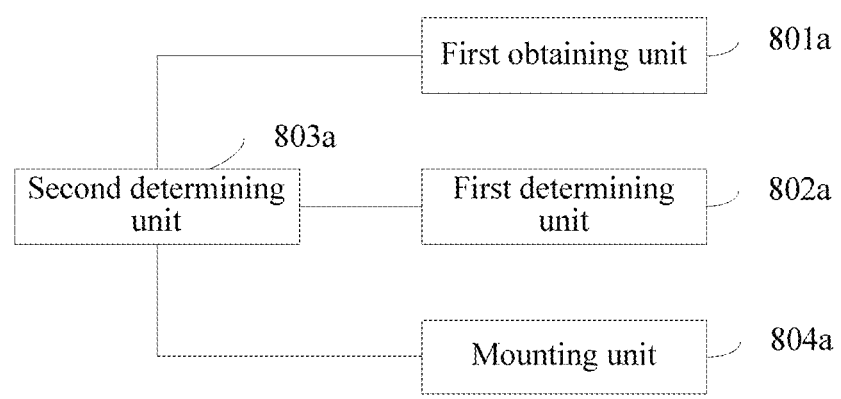
FIG. 31 is an exemplary structural diagram of a matching implementation apparatus according to an embodiment of the present disclosure.

FIG. 31 is a possible schematic structural diagram of a matching implementation apparatus. The matching implementation apparatus includes:

a first obtaining unit 801a, configured to obtain mounting correction information of a virtual accessory for a virtual object, where the virtual accessory is independent of the virtual object, and the mounting correction information is used for adapting the virtual accessory and the virtual object;

a first determining unit 802a, configured to determine a form of the virtual object;

a second determining unit 803a, configured to determine a form of the virtual accessory based on the form of the virtual object and the mounting correction information; and a mounting unit 804a, configured to mount, to the virtual object, the accessory whose form is determined.

The first obtaining unit 801a may be configured to perform 201 in the embodiment shown in FIGS. 25, 301 and 302 in the embodiment shown in FIG. 26, and 501 and 502 in the embodiment shown in FIG. 28A and FIG. 28B.

The first determining unit 802a may be configured to perform 202 in the embodiment shown in FIG. 25, 303 in the embodiment shown in FIGS. 26, and 503, 505 (where 505 may alternatively be performed by an adjustment unit 803), 506, and 508 in the embodiment shown in FIG. 28A and FIG. 28B.

The second determining unit 803a may be configured to perform 203 in the embodiment shown in FIG. 25, 304 in the embodiment shown in FIGS. 26, and 504, 507, and 509 in the embodiment shown in FIG. 28A and FIG. 28B.

The mounting unit 804a may be configured to perform 204 in the embodiment shown in FIG. 25, 305 in the embodiment shown in FIGS. 26, and 510 and 511 in the embodiment shown in FIG. 28A and FIG. 28B.

In addition, the apparatus may further include:

a second obtaining unit, configured to obtain model data of the virtual accessory, where the model data of the virtual accessory includes at least a first mesh model and a first virtual framework, the first virtual framework is a virtual framework corresponding to the virtual accessory, the first mesh model is a deformable mesh model corresponding to the virtual accessory, and a form of the first mesh model is affected by a pose of the first virtual framework; and a third obtaining unit, configured to obtain model data of the virtual object, where the model data of the virtual object includes at least a second virtual framework and a second mesh model, the second virtual framework is a virtual framework corresponding to the virtual object, the second mesh model is a deformable mesh model corresponding to the virtual object, and a form of the first mesh model is affected by a pose of the second virtual framework The first virtual framework is a part of the second virtual framework.

The form of the virtual object includes the form of the second mesh model.

The first determining unit is specifically configured to determine a form of the second mesh model in a current time based on a pose of the second virtual framework in the current time.

The form of the virtual object includes the form of the first mesh model.

The second determining unit is specifically configured to:

determine a form of the first mesh model in the current time based on the mounting correction information and a pose of the first virtual framework in the current time.

The pose of the first virtual framework in the current time is determined based on the pose of the second virtual framework in the current time.

The pose of the second virtual framework is represented by a status of a skeleton included in the second virtual framework.

The first determining unit is specifically configured to:

determine the form of the second mesh model in the current time based on a status of the skeleton included in the second virtual framework in the current time.

The pose of the first virtual framework is represented by a status of a skeleton included in the first virtual framework.

The second determining unit is specifically configured to:

determine the form of the first mesh model in the current time based on the mounting correction information and a status of the skeleton included in the first virtual framework in the current time.

The virtual accessory includes a point-hanging accessory or an accessory participating in skeleton-skinning calculation.

The form of the second mesh model is represented by a location of each mesh vertex in the first mesh model.

The status of the skeleton included in the second virtual framework is represented by a transform matrix set of the second virtual framework.

The first determining unit includes:

a first calculation subunit, configured to calculate a transform matrix set corresponding to the second virtual framework in a current frame;

a first interpolation subunit, configured to perform interpolation based on transform matrix sets corresponding to the second virtual framework in a previous key frame and the current frame to obtain a transform matrix set of the second virtual framework in the current time; and a second calculation subunit, configured to calculate a coordinate value of each mesh vertex in the second mesh model in the current time based on the transform matrix set of the second virtual framework in the current time.

The status of the skeleton included in the first virtual framework is represented by a transform matrix set of the first virtual framework.

The form of the first mesh model is represented by a location of each mesh vertex in the first mesh model.

The mounting correction information includes:

an offset value of the mesh vertex in the first mesh model relative to the skeleton in the first virtual framework, a rotation angle of the mesh vertex in the first mesh model relative to the skeleton in the first virtual framework, and/or a zoom ratio of the first mesh model.

The second determining unit includes:

an extraction subunit, configured to extract, from the transform matrix set corresponding to the second virtual framework in the current frame, a transform matrix set corresponding to the first virtual framework in the current frame;

a third calculation subunit, configured to calculate, based on the mounting correction information and the extracted transform matrix set, a corrected transform matrix set corresponding to the first virtual framework in the current frame;

a second interpolation subunit, configured to perform interpolation based on corrected transform matrix sets corresponding to the first virtual framework in the previous key frame and the current frame to obtain a corrected transform matrix set corresponding to the first virtual framework in the current time; and a fourth calculation subunit, configured to calculate a coordinate value of each mesh vertex in the first mesh model in the current time based on the corrected transform matrix set.

The model data of the virtual accessory further includes texture data of each mesh vertex in the first mesh model, and the model data of the virtual object further includes texture data of each mesh vertex in the second mesh model.

The mounting unit includes:

a first shading subunit, configured to shade each mesh vertex in the second mesh model based on the coordinate value and texture data of each mesh vertex in the second mesh model in the current time; and a second shading subunit, configured to shade each mesh vertex in the first mesh model based on the coordinate value and texture data of each mesh vertex in the first mesh model in the current time.

An embodiment of the present disclosure further provides a terminal, including any of the foregoing matching implementation apparatuses.

The embodiments in this specification are all described in a progressive manner. Descriptions of each of the embodiments focus on differences from other embodiments, and similar parts between the embodiments are mutually referenced. The apparatus disclosed in the embodiments is substantially similar to the method disclosed in the embodiments and therefore is only briefly described, and for the associated part, refer to the method descriptions.

A person skilled in the art may further realize that, in combination with the embodiments herein, units and algorithm, steps of each example described can be implemented by using electronic hardware, computer software, or the combination thereof. In order to clearly describe the interchangeability between the hardware and the software, compositions and steps of each example have been generally described according to functions in the foregoing descriptions. Whether the functions are implemented by using hardware or software depends on a particular application and a design constraint condition of the technical solution. A person skilled in the art may implement described functions for each particular application by using different methods, but it should not be considered that the implementation goes beyond the scope of the present disclosure.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a WD-ROM, or any storage medium of other forms well-known in the technical field.

The above descriptions of the disclosed embodiments enable a person skilled in the art to implement or use the present disclosure. Various modifications to these embodiments are obvious to a person skilled in the art, the general principles defined in the present disclosure may be implemented in other embodiments without departing from the spirit and scope of the present disclosure. Therefore, the present disclosure is not limited to these embodiments illustrated in the present disclosure, but needs to conform to the broadest scope consistent with the principles and novel features disclosed in the present disclosure.

What is claimed is:

1. An image compositing method performed at a computing device having one or more processors and memory storing programs to be executed by the one or more processors, the method comprising:

obtaining first data of a skeletal model of a simulation object and skeleton data of an accessory to be composited to the simulation object;

determining, based on the first data and the skeleton data of the accessory, a target skeleton that is on the skeletal model and that corresponds to the accessory, further including:

establishing a correspondence between the skeleton data of the accessory and the first data, wherein the accessory is bound to the skeletal model; and determining, based on the correspondence between the skeleton data of the accessory and the first data, the target skeleton corresponding to the accessory;

obtaining, from the first data, first target data corresponding to the target skeleton;

adjusting, based on preconfigured offset data of the target skeleton, the first target data corresponding to the target skeleton to obtain first adjusted data; and performing shading based on the first adjusted data and the first data to obtain the simulation object composited with the accessory.

2. The method according to claim 1, further comprising:

obtaining, when animation update is performed on the simulation object, second data that is of the skeletal model of the simulation object and that is obtained after the animation update;

obtaining, from the second data, second target data corresponding to the target skeleton;

adjusting, based on the offset data of the target skeleton, the second target data corresponding to the target skeleton to obtain second adjusted data; and performing shading based on the second adjusted data and the second data to obtain the simulation object composited with the accessory that is obtained after the animation update.

3. The method according to claim 2, wherein the performing shading based on the first adjusted data and the first data to obtain the simulation object composited with the accessory comprises:

obtaining skin data of the simulation object and skin data of the accessory;

binding the skin data of the simulation object to the first data to obtain skin binding data of the simulation object, and shading the skin binding data to obtain the simulation object;

shading the first adjusted data and the skin data of the accessory to obtain the accessory; and compositing the simulation object and the accessory to obtain the simulation object composited with the accessory.

4. The method according to claim 3, wherein the skin data of the simulation object comprises a plurality of vertexes, the skin data of the accessory comprises a plurality of vertexes, and the performing shading based on the first adjusted data and the first data to obtain the simulation object composited with the accessory further comprises:

calculating first world coordinates of each vertex based on the first adjusted data and the first data; and performing shading based on the first world coordinates of each vertex to obtain the simulation object composited with the accessory.

5. The method according to claim 4, wherein the performing shading based on the second adjusted data and the second data to obtain the simulation object composited with the accessory that is obtained after the animation update further comprises:

calculating second world coordinates of each vertex based on the second adjusted data and the second data; and performing shading based on the second world coordinates of each vertex to obtain the simulation object composited with the accessory that is obtained after the animation update.

6. A computing device, comprising:

one or more processors;

memory; and a plurality of programs stored in the memory that, when executed by the one or more processors, cause the computing device to perform a plurality of operations including:

obtaining first data of a skeletal model of a simulation object and skeleton data of an accessory to be composited to the simulation object;

determining, based on the first data and the skeleton data of the accessory, a target skeleton that is on the skeletal model and that corresponds to the accessory, further including:

establishing a correspondence between the skeleton data of the accessory and the first data, wherein the accessory is bound to the skeletal model; and determining, based on the correspondence between the skeleton data of the accessory and the first data, the target skeleton corresponding to the accessory;

obtaining, from the first data, first target data corresponding to the target skeleton;

adjusting, based on preconfigured offset data of the target skeleton, the first target data corresponding to the target skeleton to obtain first adjusted data; and performing shading based on the first adjusted data and the first data to obtain the simulation object composited with the accessory.

7. The computing device according to claim 6, wherein the plurality of operations further comprise:

obtaining, when animation update is performed on the simulation object, second data that is of the skeletal model of the simulation object and that is obtained after the animation update;

obtaining, from the second data, second target data corresponding to the target skeleton;

adjusting, based on the offset data of the target skeleton, the second target data corresponding to the target skeleton to obtain second adjusted data; and performing shading based on the second adjusted data and the second data to obtain the simulation object composited with the accessory that is obtained after the animation update.

8. The computing device according to claim 7, wherein the operation of performing shading based on the first adjusted data and the first data to obtain the simulation object composited with the accessory comprises:

obtaining skin data of the simulation object and skin data of the accessory;

binding the skin data of the simulation object to the first data to obtain skin binding data of the simulation object, and shading the skin binding data to obtain the simulation object;

shading the first adjusted data and the skin data of the accessory to obtain the accessory; and compositing the simulation object and the accessory to obtain the simulation object composited with the accessory.

9. The computing device according to claim 8, wherein the skin data of the simulation object comprises a plurality of vertexes, the skin data of the accessory comprises a plurality of vertexes, and the operation of performing shading based on the first adjusted data and the first data to obtain the simulation object composited with the accessory further comprises:

calculating first world coordinates of each vertex based on the first adjusted data and the first data; and performing shading based on the first world coordinates of each vertex to obtain the simulation object composited with the accessory.

10. The computing device according to claim 9, wherein the operation of performing shading based on the second adjusted data and the second data to obtain the simulation object composited with the accessory that is obtained after the animation update further comprises:

calculating second world coordinates of each vertex based on the second adjusted data and the second data; and performing shading based on the second world coordinates of each vertex to obtain the simulation object composited with the accessory that is obtained after the animation update.

11. A non-transitory computer readable storage medium storing a plurality of instructions in connection with a computing device having one or more processors, wherein the plurality of instructions, when executed by the one or more processors, cause the computing device to perform a plurality of operations including:

obtaining first data of a skeletal model of a simulation object and skeleton data of an accessory to be composited to the simulation object;

determining, based on the first data and the skeleton data of the accessory, a target skeleton that is on the skeletal model and that corresponds to the accessory, further including:

establishing a correspondence between the skeleton data of the accessory and the first data, wherein the accessory is bound to the skeletal model; and determining, based on the correspondence between the skeleton data of the accessory and the first data, the target skeleton corresponding to the accessory;

obtaining, from the first data, first target data corresponding to the target skeleton;

adjusting, based on preconfigured offset data of the target skeleton, the first target data corresponding to the target skeleton to obtain first adjusted data; and performing shading based on the first adjusted data and the first data to obtain the simulation object composited with the accessory.

12. The non-transitory computer readable storage medium according to claim 11, wherein the plurality of operations further comprise:

obtaining, when animation update is performed on the simulation object, second data that is of the skeletal model of the simulation object and that is obtained after the animation update;

obtaining, from the second data, second target data corresponding to the target skeleton;

adjusting, based on the offset data of the target skeleton, the second target data corresponding to the target skeleton to obtain second adjusted data; and performing shading based on the second adjusted data and the second data to obtain the simulation object composited with the accessory that is obtained after the animation update.

13. The non-transitory computer readable storage medium according to claim 12, wherein the operation of performing shading based on the first adjusted data and the first data to obtain the simulation object composited with the accessory comprises:

obtaining skin data of the simulation object and skin data of the accessory;

binding the skin data of the simulation object to the first data to obtain skin binding data of the simulation object, and shading the skin binding data to obtain the simulation object;

shading the first adjusted data and the skin data of the accessory to obtain the accessory; and compositing the simulation object and the accessory to obtain the simulation object composited with the accessory.

14. The non-transitory computer readable storage medium according to claim 13, wherein the skin data of the simulation object comprises a plurality of vertexes, the skin data of the accessory comprises a plurality of vertexes, and the operation of performing shading based on the first adjusted data and the first data to obtain the simulation object composited with the accessory further comprises:

calculating first world coordinates of each vertex based on the first adjusted data and the first data; and performing shading based on the first world coordinates of each vertex to obtain the simulation object composited with the accessory.

15. The non-transitory computer readable storage medium according to claim 14, wherein the operation of performing shading based on the second adjusted data and the second data to obtain the simulation object composited with the accessory that is obtained after the animation update further comprises:

calculating second world coordinates of each vertex based on the second adjusted data and the second data; and performing shading based on the second world coordinates of each vertex to obtain the simulation object composited with the accessory that is obtained after the animation update.

* * * * *